United States Patent
Kim et al.

(10) Patent No.: US 12,395,400 B2
(45) Date of Patent: Aug. 19, 2025

(54) ELECTRONIC DEVICE FOR MANAGING CONTROLLED DEVICE AND METHOD OF OPERATING THE SAME

(71) Applicant: Samsung Electronics Co., Ltd., Suwon-si (KR)

(72) Inventors: Namjin Kim, Suwon-si (KR); Sungmi Park, Suwon-si (KR); Sijae Kim, Suwon-si (KR); Minkyung Jo, Suwon-si (KR); Hyeonjin Kim, Suwon-si (KR); Hansoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 18/180,279

(22) Filed: Mar. 8, 2023

(65) Prior Publication Data
US 2023/0370328 A1 Nov. 16, 2023

Related U.S. Application Data

(63) Continuation of application No. PCT/KR2023/001990, filed on Feb. 10, 2023.

(30) Foreign Application Priority Data

May 13, 2022 (KR) .................. 10-2022-0058889
Jul. 19, 2022 (KR) .................. 10-2022-0089118

(51) Int. Cl.
*H04L 41/0663* (2022.01)
*G06F 9/451* (2018.01)
(Continued)

(52) U.S. Cl.
CPC ......... *H04L 41/0663* (2013.01); *G06F 9/453* (2018.02); *H04L 41/0681* (2013.01); *H04L 63/083* (2013.01)

(58) Field of Classification Search
None
See application file for complete search history.

(56) References Cited

U.S. PATENT DOCUMENTS 11,006,382 B2  5/2021  Chang et al.
11,057,379 B2  7/2021  Chung
(Continued)

FOREIGN PATENT DOCUMENTS

KR  10-2013-0015208 A  2/2013
KR  10-2014-0088777 A  7/2014
(Continued)

OTHER PUBLICATIONS

International Search Report and written opinion dated May 16, 2023, issued in International Application No. PCT/KR2023/001990.

(Continued)

*Primary Examiner* — Angela Nguyen
(74) *Attorney, Agent, or Firm* — Jefferson IP Law, LLP

(57) ABSTRACT

An electronic device is provided. The electronic device includes a communication circuit and at least one processor. At least one processor is configured to receive device information of an external electronic device from a server, display a guide screen for guiding a communication connection with the external electronic device, based on the device information, establish the communication connection with the external electronic device through the communication circuit, based on a user input on the guide screen, receive connection information comprising an error code related to an offline state of the external electronic device and device log data from the external electronic device through the communication connection, transmit a recovery command to the external electronic device through the communication connection, based on the error code and the device log data, and receive a message indicating that the (Continued)

external electronic device is connected to the server from the server.

20 Claims, 22 Drawing Sheets

(51) Int. Cl.
    *H04L 9/40*     (2022.01)
    *H04L 41/0681*     (2022.01)

(56) References Cited

U.S. PATENT DOCUMENTS

| | | |
|---|---|---|
| 2013/0060359 A1 | 3/2013 | Kim et al. |
| 2013/0086437 A1 | 4/2013 | Manning et al. |
| 2015/0249512 A1 | 9/2015 | Adimatyam et al. |
| 2017/0054589 A1 | 2/2017 | Baranski et al. |
| 2017/0123736 A1* | 5/2017 | Park .................. G06F 3/1234 |
| 2017/0353454 A1* | 12/2017 | Cooper ................ H04L 63/10 |
| 2019/0097872 A1 | 3/2019 | Lee et al. |
| 2019/0129780 A1* | 5/2019 | DelSordo ............ G06F 11/0793 |
| 2020/0305107 A1 | 9/2020 | Chang et al. |

FOREIGN PATENT DOCUMENTS

| | | |
|---|---|---|
| KR | 10-1605351 B1 | 3/2016 |
| KR | 10-1815821 B1 | 12/2017 |
| KR | 10-1873991 A | 7/2018 |
| KR | 10-2018-0105102 A | 9/2018 |
| KR | 10-1959507 B1 | 3/2019 |
| KR | 10-2019-0035433 A1 | 4/2019 |
| KR | 10-2020-0112494 A | 10/2020 |
| WO | 2015/069262 A1 | 5/2015 |
| WO | 2020/043006 A1 | 3/2020 |
| WO | 2022/071784 A1 | 4/2022 |

OTHER PUBLICATIONS

European Search Report dated Jun. 12, 2025, issued in European Application No. 23803662.8.

* cited by examiner

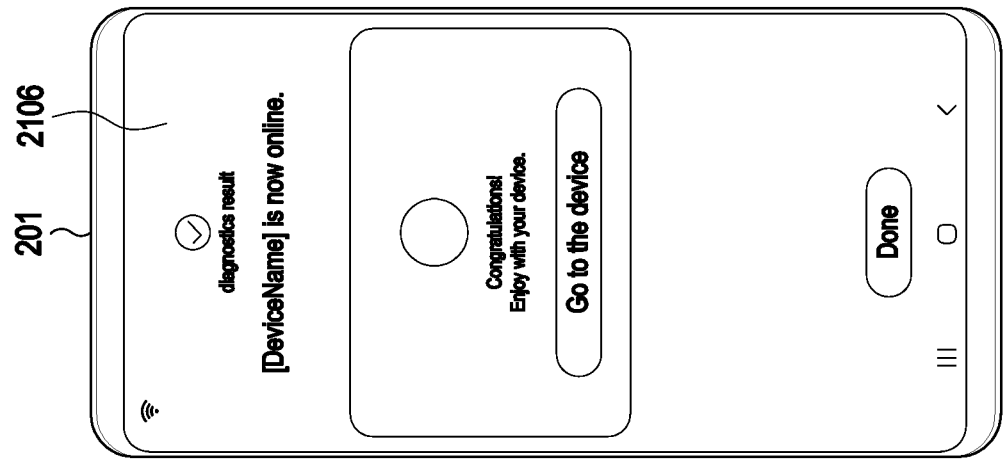
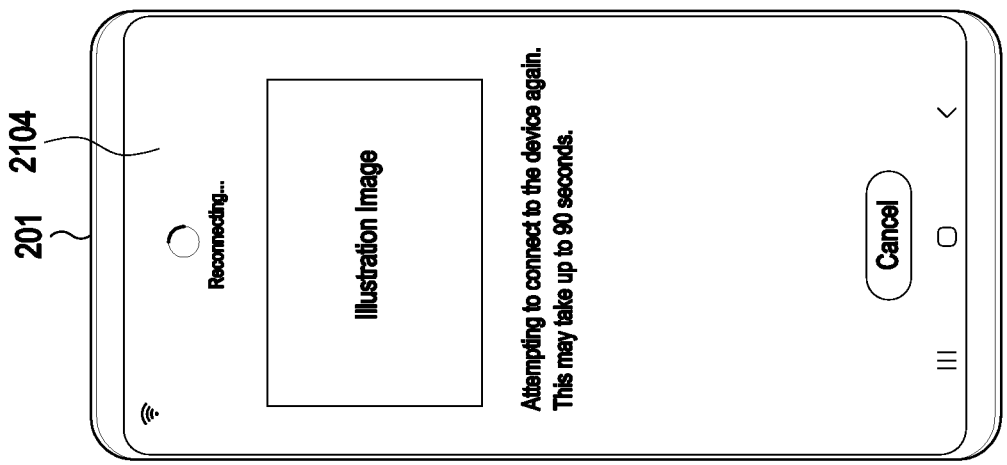
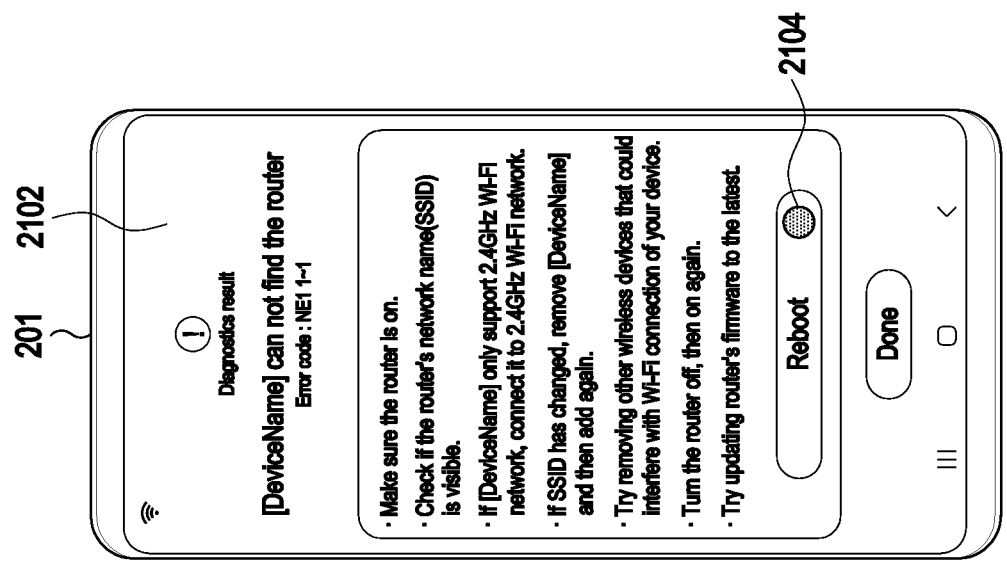
FIG. 21

ELECTRONIC DEVICE FOR MANAGING CONTROLLED DEVICE AND METHOD OF OPERATING THE SAME

CROSS-REFERENCE TO RELATED APPLICATION(S)

This application is a continuation application, claiming priority under § 365(c), of an International application No. PCT/KR2023/001990, filed Feb. 10, 2023, which is based on and claims the benefit of a Korean patent application number 10-2022-0058889, filed on May 13, 2022, in the Korean Intellectual Property Office, and of a Korean patent application number 10-2022-0089118, filed on Jul. 19, 2022, in the Korean Intellectual Property Office, the disclosure of each of which is incorporated by reference herein in its entirety.

TECHNICAL FIELD

The disclosure relates to an electronic device for managing a controlled device and a method of operating the same.

BACKGROUND ART

Various services and additional functions provided through a user terminal, for example, an electronic device such as a smartphone, have increased. In order to increase effective value of the electronic device and meet various user demands, communication service providers or electronic device manufacturers are competitively developing electronic devices providing various functions. Accordingly, various functions provided through the electronic device have gradually advanced.

With the development of wireless communication technologies, devices using artificial intelligence (AI) have been widely introduced. For example, home appliances connected to the network through the application of Internet of things (IoT) technology can use artificial intelligence. The IoT technology may provide an intelligent Internet technology service for creating a new value for human's lives by collecting and analyzing data generated by devices. The IoT technology may be applied to fields such as smartphones, smart buildings, smart cities, smart cars, and smart home appliances through convergence and combination between the conventional Internet technology and various industries.

Meanwhile, various home appliances exist at home for convenience of users. Various services for more conveniently operating or controlling home appliances through the IoT technology have been proposed. The home network technology may provide users within the home with various services through the home network. For example, the user may control various controlled devices (for example, home appliances to which the IoT technology is applied) included in the home network through a personal electronic device (for example, a smartphone). The user may want to receive more various services in order to control the controlled devices. Accordingly, a request for developing various technologies of reflecting a user's intention to manage the controlled devices has been made.

The user may perform a procedure (for example, onboarding) for registering a controlled device in a network (for example, a cloud server) by using an electronic device (for example, a smartphone or a wearable device) which the user owns to control the controlled device (for example, a television (TV), an air conditioner, a washing machine, a security camera, a lighting device, or a switch). The electronic device may connect the controlled device with a user account by controlling the controlled device to be registered in the server. The electronic device may access the server through a client application by using the user account and control the controlled device.

The electronic device may identify and control states of controlled devices registered for the user account through the client application. When the controlled device cannot be normally connected to the server, the controlled device may be displayed as an offline state in the client application. The controlled device may be in the offline state due to various causes such as a device problem, a network error, a cloud error, or an application error. When the controlled device is displayed as the offline state, the electronic device may provide an offline guide popup by using a plug-in application. In the prior art, the offline guide popup provides only a general help guide like identifying a network environment within the home and identifying a power plug, which does not actually help for solving a connection error of the controlled device.

Further, when a disconnection (offline) problem occurs due to a software error in an always-on controlled device (for example, a refrigerator), the connection cannot be recovered by power on/off, and the power plug should be unplugged and then plugged back, but the user may have difficulty in unplugging and then plugging back a build appliance such as a refrigerator. In this case, it is required to delete the controlled device and then register the same in the server again in order to resolve the offline state of the controlled device, but the user has difficulty in accessing an accurate help guide. Conventional registration information should be deleted and then the registration procedure should be performed again to re-register the controlled device, which inconveniences the user.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Aspects of the disclosure are to address at least the above-mentioned problems and/or disadvantages and to provide at least the advantages described below. Accordingly, an aspect of the disclosure is to connect an electronic device to a controlled device in an offline state and provide easy connectivity for diagnostics.

Another aspect of the disclosure is to provide an electronic device for detecting an offline cause through direct connection diagnostics of the controlled device in the offline state and providing a solution suitable for the controlled device, and a method of operating the same.

Another aspect of the disclosure is to provide an electronic device for improving safety of a service and usage satisfaction of the controlled device through log information in direct connection diagnostics of the controlled device in the offline state, and a method of operating the same.

The technical problem to be solved in the disclosure may not be limited to the above mentioned technical problem, and other technical problems which are not mentioned may be clearly understood, through the following descriptions, by those skilled in the art of the disclosure.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit and at least one processor operatively connected to the communication circuit. The at least one processor may be configured to receive device information of an external electronic device from a server. The at least one processor may be configured to display a guide screen for guiding a communication connection with the external electronic device, based on the device information. The at least one processor may be configured to establish the communication connection with the external electronic device through the communication circuit, based on a user input on the guide screen. The at least one processor may be configured to receive connection information including an error code related to an offline state of the external electronic device and device log data from the external electronic device through the communication connection. The at least one processor may be configured to transmit a recovery command to the external electronic device through the communication connection, based on the error code and the device log data. The at least one processor may be configured to receive a message indicating that the external electronic device is connected to the server from the server.

In accordance with another aspect of the disclosure, a method of operating an electronic device is provided. The method includes receiving device information of an external electronic device from a server. The method includes displaying a guide screen for guiding a communication connection with the external electronic device, based on the device information. The method includes establishing the communication connection with the external electronic device through the communication circuit, based on a user input on the guide screen. The method includes receiving connection information including an error code related to an offline state of the external electronic device and device log data from the external electronic device through the communication connection. The method includes transmitting a recovery command to the external electronic device through the communication connection, based on the error code and the device log data. The method includes receiving a message indicating that the external electronic device is connected to the server from the server.

A non-transitory computer-readable storage medium storing one or more programs according to an embodiment is provided. The one or more programs includes instructions configured to cause, when executed by at least one processor of an electronic device, the electronic device to receive device information of an external electronic device from a server, display a guide screen for guiding a communication connection with the external electronic device, based on the device information, establish the communication connection with the external electronic device through the communication circuit, based on a user input on the guide screen, receive connection information including an error code related to an offline state of the external electronic device and device log data from the external electronic device through the communication connection, transmit a recovery command to the external electronic device through the communication connection, based on the error code and the device log data, and receive a message indicating that the external electronic device is connected to the server from the server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 21 illustrates user interface screens for performing error handling through a secure connection according to an embodiment of the disclosure.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
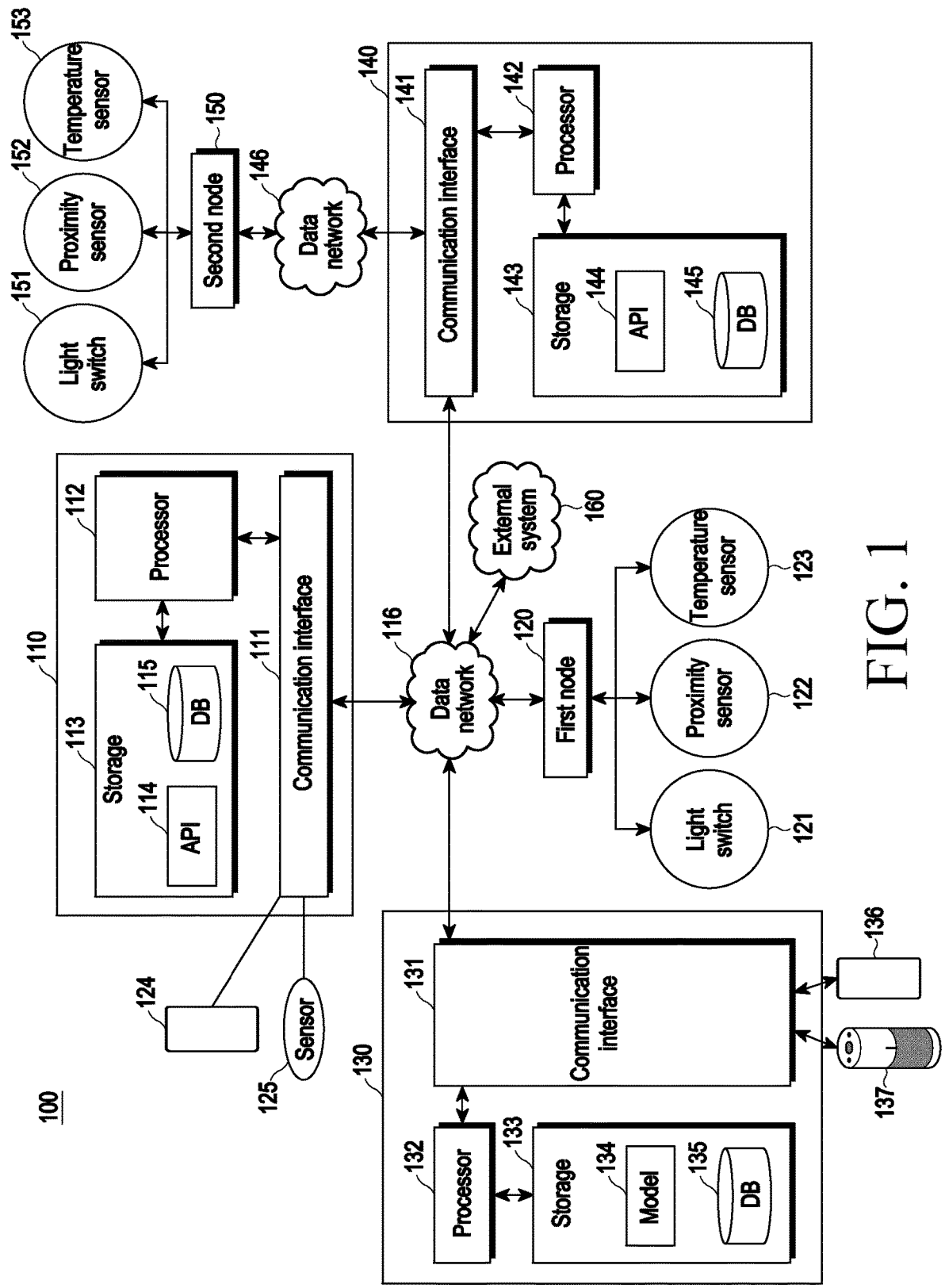
FIG. 1 illustrates an Internet of things (IoT) system according to an embodiment of the disclosure.

FIG. 1 illustrates an Internet of Things (IoT) system 100 according to an embodiment of the disclosure. Meanwhile, at least some of the elements in FIG. 1 may be omitted and elements which are not illustrated may be further included.

Referring to FIG. 1, the IoT system 100 according to an embodiment includes a plurality of electronic devices which can be connected to a data network 116 or 146. For example, the IoT system 100 may include at least one of a first IoT server 110, a first node 120, a voice assistance server 130, a second IoT server 140, a second node 150, or devices 121, 122, 123, 124, 125, 136, 137, 151, 152, and 153.

According to an embodiment, the first IoT server 110 may include at least one of a communication interface 111, a processor 112, or a storage unit 113. The second IoT server 140 may include at least one of a communication interface 141, a processor 142, or a storage unit 143. The "IoT server" in this document may remotely control and/or monitor one or more devices (for example, the devices 122, 123, 124, 125, 151, 152, and 153) through a relay device (for example, the first node 120 or the second node 150) or directly without any relay device on the basis of, for example, a data network (for example, the data network 116 or the data network 146). The "device" may be a sensor, a home appliance, an electronic device for an office, or a device for performing a process disposed (or located) within a local environment such as, for example, a house, an office, a factory, a building, an outside point, or another type of site, and the device type has no limitation. A device for receiving a control command and performing an operation corresponding to the control command may be named a "target device." The IoT server may be named a central server in that the IoT server selects a target device from among a plurality of devices and provides a control command.

According to an embodiment, the first IoT server 110 may communicate with the devices 121, 122, and 123 through the data network 116. The data network 116 may refer to a network for long-range communication, such as, for example, Internet or a computer network (for example, local area network (LAN) or wide area network (WAN)) or may include a cellular network.

According to an embodiment, the first IoT server 110 may be connected to the data network 116 through the communication interface 111. The communication interface 111 may include a communication device (or a communication module) for supporting communication of the data network 116, and may be integrated into one element (for example, a single chip) or implemented as a plurality of separate elements (for example, a plurality of chips). The first IoT server 110 may communicate with the devices 121, 122, and 123 through the first node 120. The first node 120 may receive data from the first IoT server 110 through the data network 116 and transmit the received data to at least some of the devices 121, 122, and 123. Alternatively, the first node 120 may receive data from at least some of the devices 121, 122, and 123 and transmit the received data to the first IoT server 110 through the data network 116. The first node 120 may function as a bridge between the data network 116 and the devices 121, 122, and 123. Meanwhile, although FIG. 1 illustrates that there is one first node 120, this is only an example and the number of first nodes has no limitation.

The "node" in this document may be an edge computing system or a hub device. According to an embodiment, the first node 120 may support wired communication and/or wireless communication of the data network 116 and also support wired communication and/or wireless communication with the devices 121, 122, and 123. For example, the first node 120 may be connected to the devices 121, 122, and 123 through a short-range communication network such as at least one of Bluetooth, Wi-Fi, Wi-Fi direct, Z-wave, Zig-bee, INSETEON, X10, or infrared data association (IrDA), but the communication type has no limitation. The first node 120 may be disposed (or located) within the same environment as, for example, a home, an office, a factory, a building, an outside point, or another type of site. Accordingly, the devices 121, 122, and 123 may be monitored and/or controlled by a service provided by the first IoT server 110, and may not be required to have capability of complete network communication (for example, Internet communication) for direction connection to the first IoT server 110. Although it is illustrated that the devices 121, 122, and 123 are implemented as electronic devices within a house, such as, for example, a light switch, a proximity sensor, a temperature sensor, or the like, they are only examples and have no limitation.

According to an embodiment, the first IoT server 110 may support direct communication with the devices 124 and 125. The "direct communication" herein is communication that does not pass through a relay device, such as, for example, the first node 120, and may be, for example, communication through a cellular communication network and/or a data network.

According to an embodiment, the first IoT server 110 may transmit a control command to at least some of the devices 121, 122, 123, 124, and 125. The "control command" may be data causing a controllable device to perform a specific operation, and the specific operation is an operation performed by the device and may include outputting information, sensing information, reporting information, and managing (for example, deleting or creating) information, but the type thereof has no limitation. For example, the processor 112 may acquire information (or a request) for generating a control command from the outside (for example, at least some of the voice assistant server 130, the second IoT server 140, an external system 160, or the devices 121, 122, 123, 124, and 125) and generate the control command on the basis of the acquired information. Alternatively, the processor 112 may generate the control command when a monitoring result of at least some of the devices 121, 122, 123, 124, and 125 satisfy a predetermined condition. The processor 112 may control the communication interface 111 to transmit the control command to a target device.

According to an embodiment, the processor 112, the processor 132, or the processor 142 may be implemented by a combination of one or more of a general purpose processor, such as a central processing unit (CPU), a digital signal processor (DSP), an application processor (AP), or a communication processor (CP), a graphic-dedicated processor, such as a graphical processing unit (GPU) or a vision processing unit (VPU), or an artificial intelligence-dedicated processor, such as an neural processing unit (NPU). The processing units are only examples, and the processor 112 has no limitation if the processor 112 is, for example, an operation means capable of executing instructions stored in the memory 113 and outputting an executed result.

According to an embodiment, the processor 112 may configure a web-based interface on the basis of the application programming interface (API) 114 or expose resources managed by the first IoT server 110 to the outside. The web-based interface may support, for example, communication between the first IoT server 110 and an external web service. The processor 112 may allow, for example, the external system 160 to control and/or access the devices 121, 122, and 123. The external system 160 may be, for example, a system which is irrelevant to the system 100 or an independent system which is not a portion thereof. The external system 160 may be, for example, an external server or a website. However, security for access to resources of the devices 121, 122, and 123 or the first IoT server 110 from the external system 160 is needed. According to an embodiment, the processor 112 may expose an API end point (for example, a Universal Resource Locator (URL)) based on the API 114 to the outside through an automation application. According to the above description, the first IoT server 110 may transfer the control command to a target device among the devices 121, 122, and 123. Meanwhile, the description of the communication interface 141 and the processor 142 of the second IoT server 140, and the API 144 and the database 145 of the storage unit 143 may be substantially the same as the description of the communication interface 111 and the processor 112 of the first IoT server 110, and the API 114 and the database (DB) 115 of the storage unit 113. The description of the second node 150 may be substantially the same as the description of the first node 120. The second IoT server 140 may transfer the control command to a target device among the devices 151, 152, and 153. The first IoT server 110 and the second IoT server 140 may be operated by the same service provider in one embodiment, but may be operated by different service providers in another embodiment.

According to an embodiment, the voice assistant server 130 may transmit and receive data to and from the first IoT server 110 through the data network 116. The voice assistant server 130 according to an embodiment may include at least one of the communication interface 131, the processor 132, or the storage unit 133. The communication interface 131 may communicate with a smart phone 136 or an AI speaker 137 through a data network (not shown) and/or a cellular network (not shown). The smart phone 136 or the AI speaker 137 may include a microphone, and may acquire a user voice, convert the user voice into a voice signal, and transmit the voice signal to the voice assistant server 130. The processor 132 may receive the voice signal from the smart phone 136 or the AI speaker 137 through the communication interface 131. The processor 132 may process the received voice signal on the basis of a stored model 134. The processor 132 may generate (or identify) a control command using a processing result on the basis of information stored in the data base 135. According to an embodiment, the storage unit 113, 133, or 143 may include at least one type of non-transitory storage medium among a flash memory type, a hard disk type, a multimedia card micro type, a card type memory (for example, a secure digital (SD) memory, an extreme digital (XD) memory, or the like), a Random Access Memory (RAM), a Static RAM (SRAM), a Read-Only Memory (ROM), an Electrically Erasable Programmable ROM (EEPROM), a Programmable Read-Only Memory (PROM), a magnetic memory, a magnetic disk, and an optical disk, but the type thereof has no limitation.

In various embodiments, at least one device (for example, the device 124) communicating with the first IoT server 110 may be a smartphone (for example, the electronic device 201 of FIG. 2) within the network environment.

Figure 2:
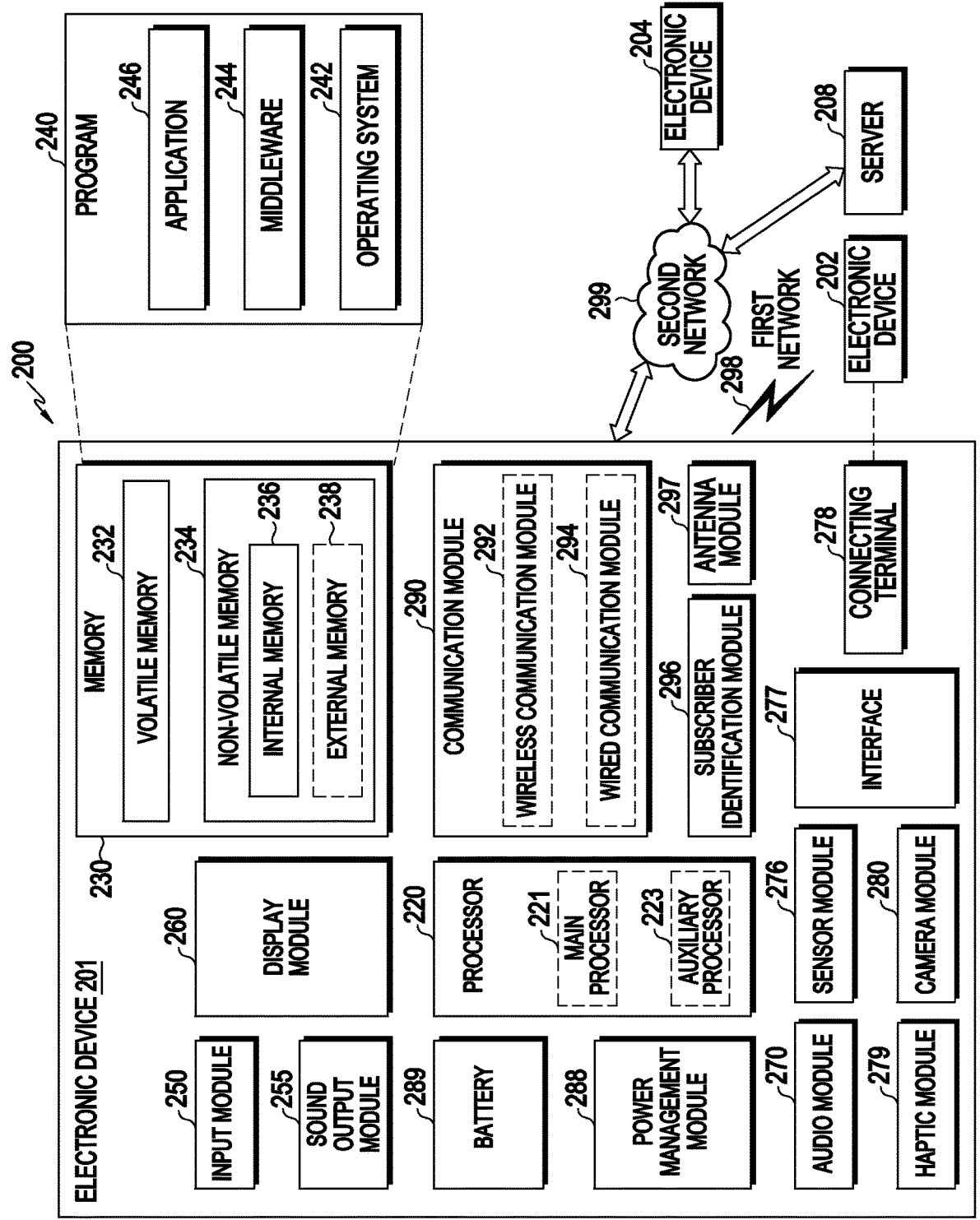
FIG. 2 is a block diagram illustrating an electronic device within a network environment according to an embodiment of the disclosure.

FIG. 2 is a block diagram illustrating an electronic device 201 in a network environment 200 according to an embodiment of the disclosure.

Referring to FIG. 2, the electronic device 201 in the network environment 200 may communicate with an electronic device 202 via a first network 298 (e.g., a short-range wireless communication network), or at least one of an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In some embodiments, at least one of the components (e.g., the connecting terminal 278) may be omitted from the electronic device 201, or one or more other components may be added in the electronic device 201. In some embodiments, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control, for example, at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active (e.g., executing an application) state. According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence model is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or an external electronic device (e.g., an electronic device 202 (e.g., a speaker or a headphone)) directly or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, an HDMI connector, a USB connector, an SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device 204 via the first network 298 (e.g., a short-range communication network, such as Bluetooth™ Wi-Fi direct, or infrared data association (IrDA)) or the second network 299 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 292 may identify or authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the millimeter wave (mmWave) band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 gigabits per second (Gbps) or more) for implementing eMBB, loss coverage (e.g., 164 Db or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., a printed circuit board (PCB)). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the external electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In another embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

Figure 3:
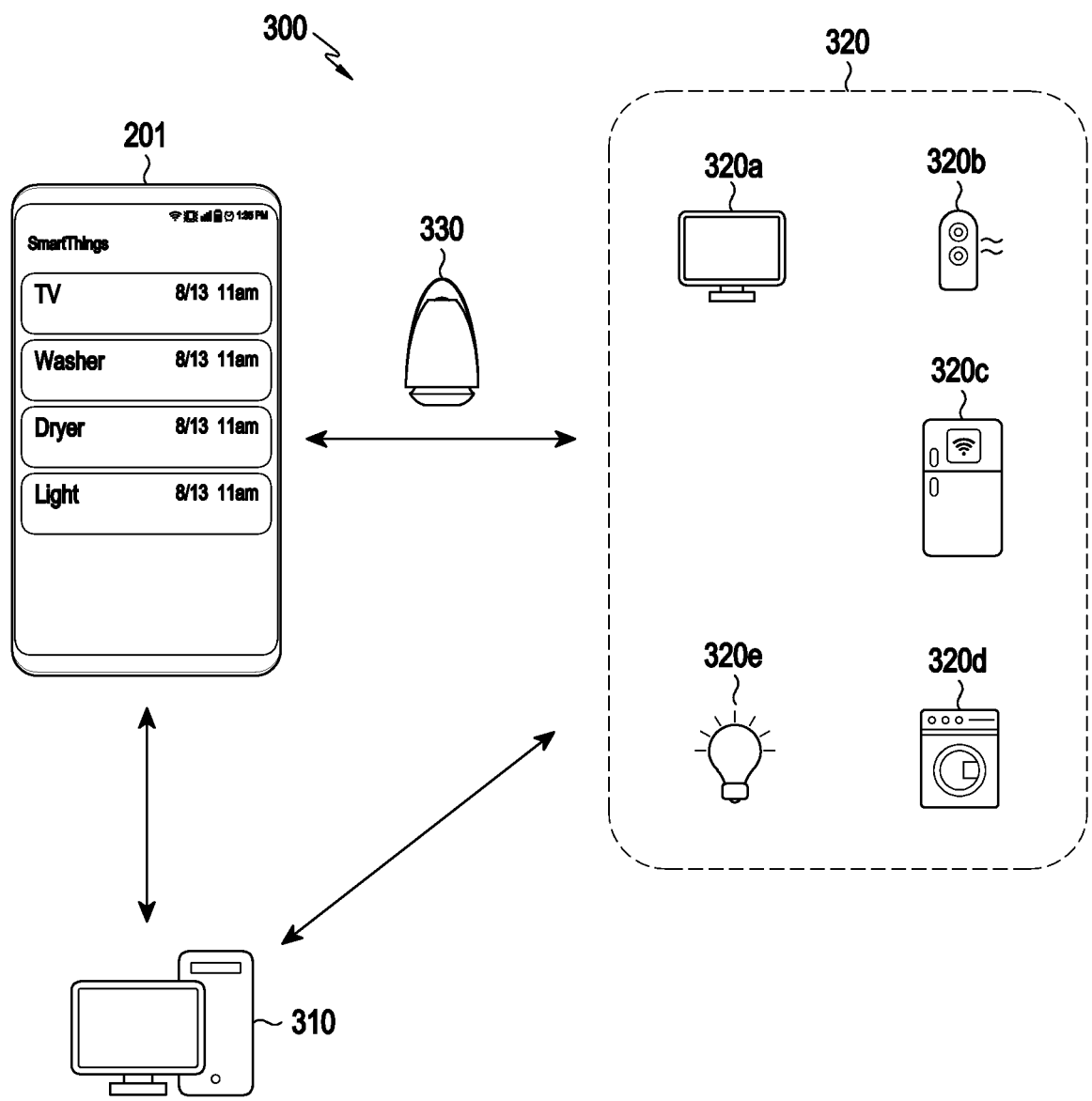
FIG. 3 illustrates a network including controlled devices according to an embodiment of the disclosure.

FIG. 3 illustrates a network including controlled devices according to an embodiment of the disclosure.

Referring to FIG. 3, a network 300 may include a server 310 operating as an IoT cloud, the electronic device 201 capable of communicating with the server 310 through network communication (for example, Internet), and at least one external electronic device 320 (for example, controlled devices 320a, 320b, 320c, 320d, and 320e) supporting the IoT technology and capable of communicating with the server 310 through network communication (for example, Internet). In an embodiment, a hub device 330 supporting the connection between the controlled device 320 and the electronic device 201 and/or the connection between the controlled device 320 and the server 310 may be further included in the network 300. In an embodiment, the electronic device 201 may communicate with the controlled device 320 through the hub device 330, the server 310, long-range wireless communication (for example, the second network 299), or short-range wireless communication (for example, the first network 298).

In an embodiment, the controlled device 320 may be controlled (for example, the state may be reported and/or a specific function may be performed) by a remote command (for example, a control command of the electronic device 201), and may include, for example, at least one of a television, an air conditioner, a refrigerator, a washing machine, a lighting device, a security camera, a sensor, or a window treatment. The controlled device 320 may communicate with the electronic device 201 through the hub device 330, communicate with the electronic device 201 through the server 310, and/or directly communicate with the electronic device 201 (for example, without through the server 310 or the hub device 330). In an embodiment, the controlled device 320 may be configured to communication with the electronic device 201 through long-range wireless communication (for example, the second network 299) or through short-range wireless communication (for example, the first network 298). In an embodiment, the controlled device 320 may be configured to communicate with the server 310 through long-range wireless communication (for example, the second network 299) or through short-range wireless communication (for example, the first network 298).

In an embodiment, the electronic device 201 may be, for example, a personal electronic device, such as a smartphone, a tablet, or a wearable device, or an electronic device including a display and a user interface, such as a television or a control console. The electronic device 201 may discover the controlled device 320 and perform a registration procedure of registering the discovered controlled device 320 in the server 310. The controlled device 320 may be registered in the server 310 to be associated with a user account. The electronic device 201 may monitor and control the controlled device 320 registered in the server 310 by using the user account.

In an embodiment, the electronic device 201 may identify the state of the controlled device 320 to be used by the user for the IoT control service or control the controlled device 320 (for example, transmit a control command indicating execution of a specific function). In an embodiment, the electronic device 201 may be an owner device included in the network 300. In an embodiment, although not illustrated, at least one member device having at least some functions and/or rights of the electronic device 201 may be included in the network 300. In an embodiment, the member device does not perform the registration procedure of the controlled device 320 but may perform the function of identifying or controlling the state of the controlled device 320 registered in the server 310.

In an embodiment, the hub device 330 is an electronic device operating the IoT control service and may be a server or a gateway located within a building (home or hotel), or a remote server located outside a building. In an embodiment, the hub device 330 may be a home appliance, such as a smartphone, a tablet, a personal computer (PC), or a TV having a hub function. Similar to the controlled device 320, the hub device 330 may be registered in the server 310 through the electronic device 201 according to at least one of the following embodiments.

Figure 4:
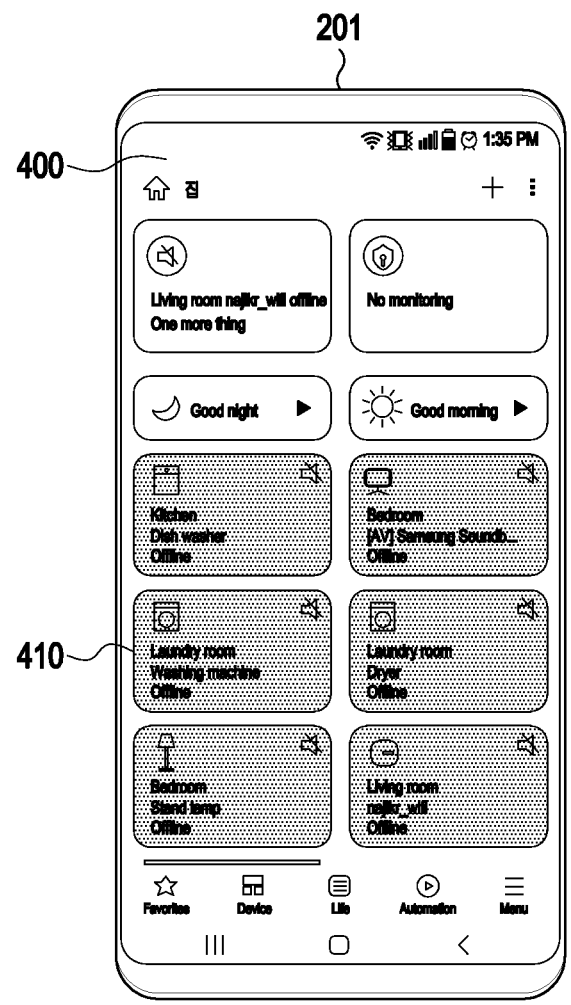
FIG. 4 illustrates a state of the controlled device displayed in the electronic device according to an embodiment of the disclosure.

FIG. 4 illustrates a state of the controlled device displayed in the electronic device according to an embodiment of the disclosure.

Referring to FIG. 4, the electronic device 201 may execute a client application for the IoT control service and display an execution screen 400 provided by the client application through a display module (for example, the display module 260). The execution screen 400 may include states (for example, at least one of an image, a location, a name, or a connection state) of at least one external electronic device (for example, the controlled device 320) registered for the user account.

In an embodiment, when an Internet connection of the controlled device 320 is disconnected, the execution screen 400 may include a state item (for example, a state item 410) displaying that the controlled device 320 is in an offline state. For example, the electronic device 101 may display the state item 410 displaying that the controlled device 320 is in the offline state on the basis of reception of information indicating that the controlled device 320 is in the offline state from the server 310. In an embodiment, the state item 410 of the controlled device 320 in the offline state may be displayed in black and white. Although not illustrated, a state item of the controlled device in an online state may be displayed in color. Although not illustrated, when a user input (for example, a touch) for the state item 410 is received, the electronic device 201 may display an offline guide popup indicating that the controlled device 320 is in the offline state. For example, the offline guide popup may include a general help guide, such as "Check whether a power cord of the device is properly plugged," "Check whether power of the device is normally turned on," Check whether a mobile phone is connected to the network," or "Check whether a Wi-Fi router to which the device is connected properly operates."

Figure 5:
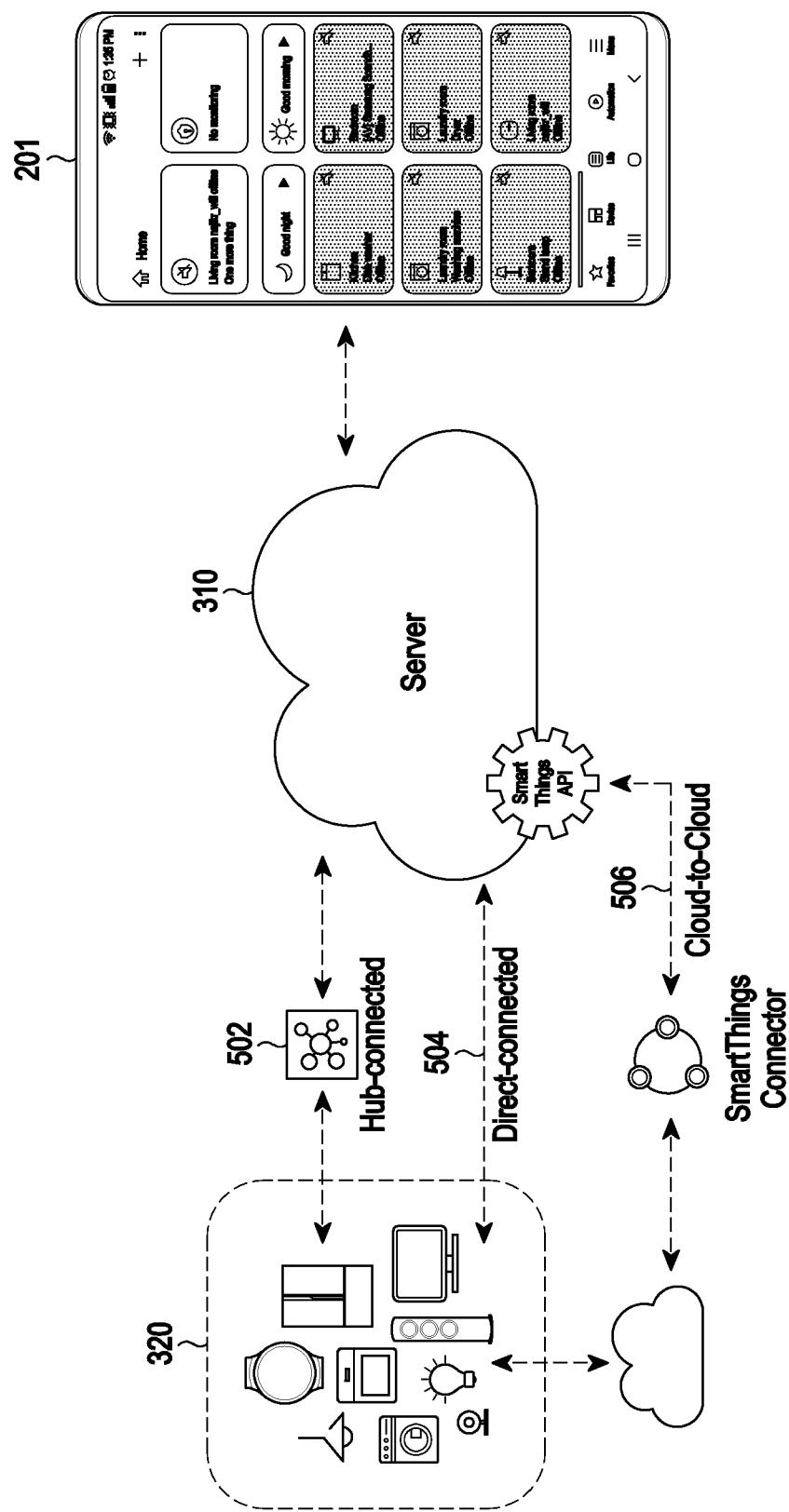
FIG. 5 illustrates a system architecture including controlled devices according to an embodiment of the disclosure.

FIG. 5 illustrates a system architecture including controlled devices according to an embodiment of the disclosure.

Referring to FIG. 5, the electronic device 201 may include a client application configured to register at least one external electronic device (for example, the controlled device 320) in the server 310 and remotely control the registered controlled device 320. The controlled device 320 may be connected to the server 310 by using at least one of, for example, a hub connection (hub-connected) 502, a direct connection (direct-connected) 504, or an inter-cloud connection (cloud-to-cloud) 506. The hub-connected scheme 502 may connect the controlled device 320 to the server 310 through a hub having a communication function, for example, Zig-bee, Z-wave, or LAN. In the direct-connected scheme 504, the controlled device 320 may be directly connected to a Wi-Fi access point (AP) and connected to the server 310 through the AP. In the cloud-to-cloud-connected scheme 506, the controlled device 320 may be registered in a third-party cloud, and may be connected to the server 310 by using an application programming interface (API) through the third-party cloud.

In an embodiment, the server 310 may include a frontend server (not shown) for managing device information registered by a manufacturer of the controlled device 320 and identify that the controlled device 320 is registered in the frontend server as a support device, so as to authenticate the controlled device 320 and insert the controlled device 320 of which the authentication is completed into a support device list and manage the same. The electronic device 201 may register (for example, onboarding) the controlled device 320 included in a support management list of the server 310 in the server 310 by using the client application. The registration (or onboarding) may mean a procedure of storing device information related to the controlled device 320 in the server 310 through the client application of the electronic device 201.

In an embodiment, when the controlled device 320 is connected to the server 310 through the direct-connected scheme 504, the controlled device 320 may become in the offline state due to a cause, for example, a device problem, a network error, a cloud error, or an application error. When the connection between the controlled device 320 and the server 310 is disconnected, the electronic device 201 may display a state item (for example, the state item 410) of the controlled device 320 as the offline state.

Figure 6:
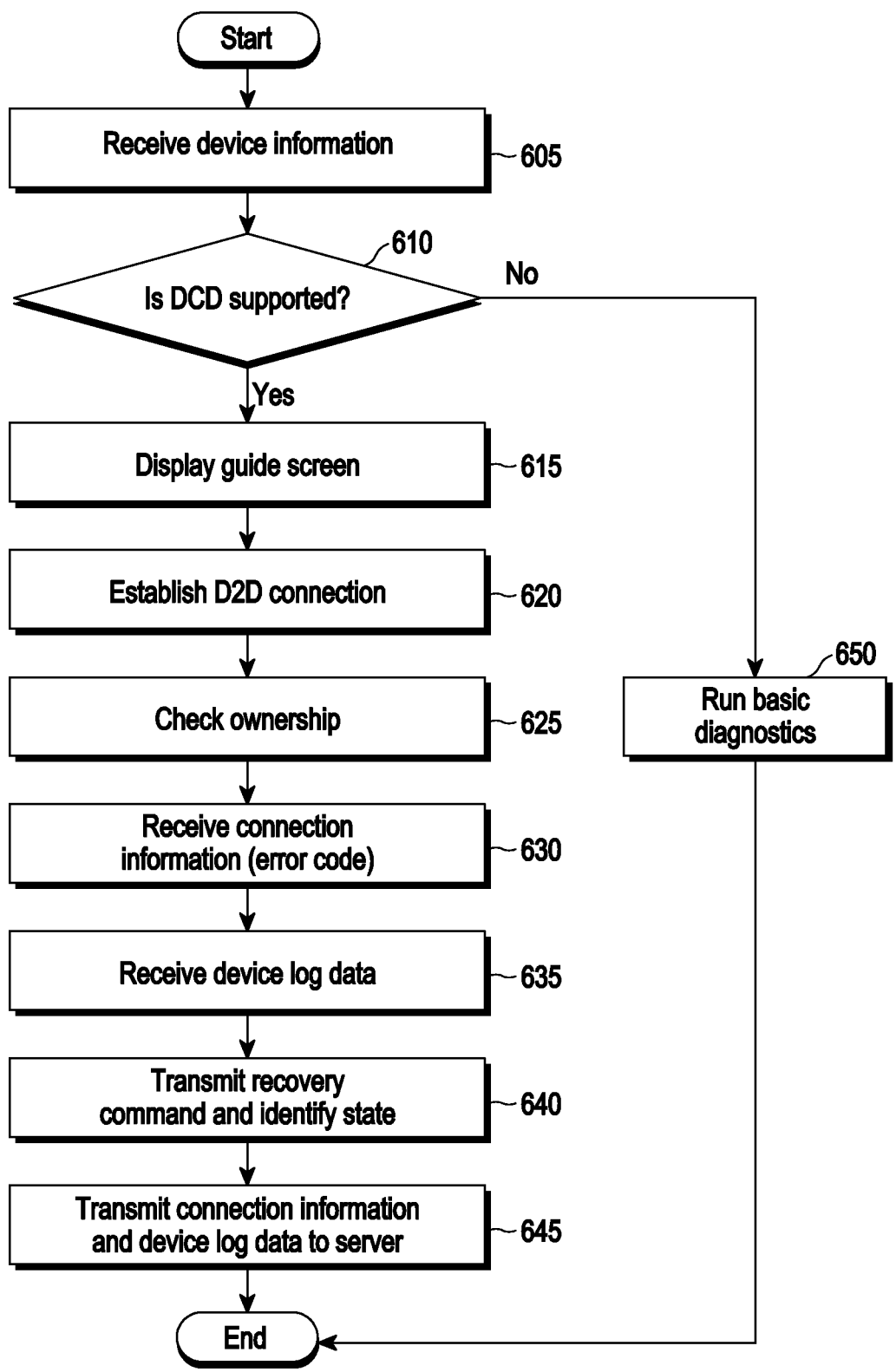
FIG. 6 is a flowchart illustrating a procedure of providing direct connection diagnostics of the controlled device according to an embodiment of the disclosure.

FIG. 6 is a flowchart illustrating a procedure of providing direct connection diagnostics of the controlled device according to an embodiment of the disclosure. At least one of the following operations may be performed by a processor (for example, the processor 220) of the electronic device 201. At least some of the following operations may be omitted or changed, or orders thereof may be changed.

Referring to FIG. 6, in operation 605, the electronic device 201 (for example, the processor 220) may receive device information of the controlled device (for example, the controlled device 320) in the offline state from the server 310. In an embodiment, the device information may include diagnostics capability information indicating whether the controlled device 320 supports direct connection diagnostics (DCD). In an embodiment, the electronic device 201 (for example, the processor 220) may receive information indicating that the controlled device (for example, the controlled device 320) is in the offline state from the server 310, and make a request for the device information of the controlled device 320 to the server 310 and receive the device information.

In operation 610, the electronic device 201 (for example, the processor 220) may determine whether the direct connection diagnostics for the controlled device 320 are supported on the basis of the device information. When the direct connection diagnostics is not supported, the electronic device 201 (for example, the processor 220) may run a basic diagnostics procedure (e.g., basic analysis) (for example, operation 720 of FIG. 7) in operation 650. On the other hand, the direct connection diagnostics (or detailed analysis) is supported, the electronic device 201 (for example, the processor 220) may proceed to operation 615. In an embodiment, the electronic device 201 (for example, the processor 220) has already known that the controlled device 320 supports the DCD, and operation 610 may be omitted.

In operation 615, the electronic device 201 (for example, the processor 220) may provide a guide screen (for example, a guide screen 1804 of FIG. 18B) to the user by using the device information for the communication connection (for example, a device-to-device (D2D) connection) with the controlled device 320. In an embodiment, the guide screen may include, for example, a device image of the controlled device 320 and a guide phrase (for example, "Turn on the device and press the button for three seconds or longer until the AP appears) as information for guiding the D2D connection between the electronic device 201 and the controlled device 320. In an embodiment, the guide screen may further include an object (for example, an input button) for starting the D2D connection. In an embodiment, the electronic device 201 (for example, the processor 220) may receive setup data (for example, the device image and the guide phrase) required for configuring the guide screen from the server 310 by using information (for example, mind and/or setupId) included in the device information. In an embodiment, the server 310 may identify that the controlled device 320 is registered in the server 310 on the basis of the information and provide the setup data to the electronic device 201.

In operation 620, the electronic device 201 (for example, the processor 220) may establish the D2D connection with the controlled device 320. In an embodiment, the D2D connection may be established on the basis of a soft AP, Bluetooth (for example, Bluetooth classic, Bluetooth legacy, or Bluetooth low energy (BLE)), or a hypertext transfer protocol (HTTP) of an Internet protocol (IP) network.

In operation 625, the electronic device 201 (for example, the processor 220) may perform a procedure of checking ownership of the controlled device 320 through the D2D connection. In an embodiment, the electronic device 201 (for example, the processor 220) may identify that the user owns the controlled device 320 on the basis of input information related to the controlled device 320. In an embodiment, the electronic device 201 (for example, the processor 220) may identify that the user owns the controlled device 320 by determining whether a personal identification number (PIN) provided from the controlled device 320 is the same as a PIN input by the user. In an embodiment, the electronic device 201 (for example, the processor 220) may capture a verification indicia (for example, a quick response (QR) code or a barcode) attached to or printed on the surface of the controlled device 320, receive a signal indicating that a specific button of the controlled device 320 is input from the controlled device 320, or receive biometric information or a password through the controlled device 320, so as to identify that the user owns the controlled device 320.

In an embodiment, the electronic device 201 (for example, the processor 220) may store credential information of the controlled device 320 (for example, a device identification (ID) of the controlled device 320) through the check of ownership. In an embodiment, when the electronic device 201 (for example, the processor 220) already has the credential information of the controlled device 320, operation 625 may be omitted.

In an embodiment, the electronic device 201 may be an owner device performing the registration procedure of the controlled device 320 or a member device which is allowed for the ownership by the owner device. When the electronic device 201 is a member device, the electronic device 201 may check ownership of the controlled device 320 by using credential information received from the owner device or received from the controlled device 320.

In operation 630, the electronic device 201 (for example, the processor 220) may receive connection information including an offline error code from the controlled device 320. In an embodiment, the offline error code may include codes for at least one of a cloud error, a network error, or an unknown error.

In operation 635, the electronic device 201 (for example, the processor 220) may receive device log data from the controlled device 320. In an embodiment, the device log data may include an operation log of the controlled device 320 (for example, at least one of power on, function execution, state change, error generation, or power off). In an embodiment, operation 635 may be omitted.

In operation 640, the electronic device 201 (for example, the processor 220) may transmit a recovery command to the controlled device 320 on the basis of the offline error code and/or the device log data and identify the state of the controlled device 320 through the server 310. In an embodiment, the recovery command may be transferred to the controlled device 320 through the D2D connection established in operation 620. In an embodiment, the electronic device 201 (for example, the processor 220) may display a help guide screen related to the offline state of the controlled device 320 which is processed on the basis of the offline error code. In an embodiment, the electronic device 201 (for example, the processor 220) may determine that the controlled device 320 is normally restored by receiving a response message indicating that the controlled device 320 is connected to the server 310 from the server 310.

In an embodiment, when the recovery command is not received by the controlled device 320, when the controlled device 320 does not normally perform self diagnostics according to the recovery command, or when the controlled device 320 is not connected to the server 310 even though the self diagnostics is performed, the server 310 may still manage the controlled device 320 as the offline state and the electronic device 201 (for example, the processor 220) may receive a response message indicating that the controlled device 320 is not connected from the server 310. In an embodiment, the electronic device 201 (for example, the processor 220) may output a message indicating that the controlled device 320 is in the offline state or the self diagnostics of the controlled device 320 has failed.

In operation 645, the electronic device 201 (for example, the processor 220) may transmit an error report message indicating that error handling of the controlled device 320 is completed to the server 310. In an embodiment, the error report message may include the connection information (for example, the offline error code) and/or the device log data. In an embodiment, the electronic device 201 (for example, the processor 220) may display an error report guide screen including an object (for example, an error report button 1906) for reporting an error and transmit the error report message to the server 310 in response to reception of a user input for the error report button. In an embodiment, when the user input for the error report button is not received or when it is determined that an error report is unnecessary according to the offline error code, the electronic device 201 may omit operation 645.

Figure 7:
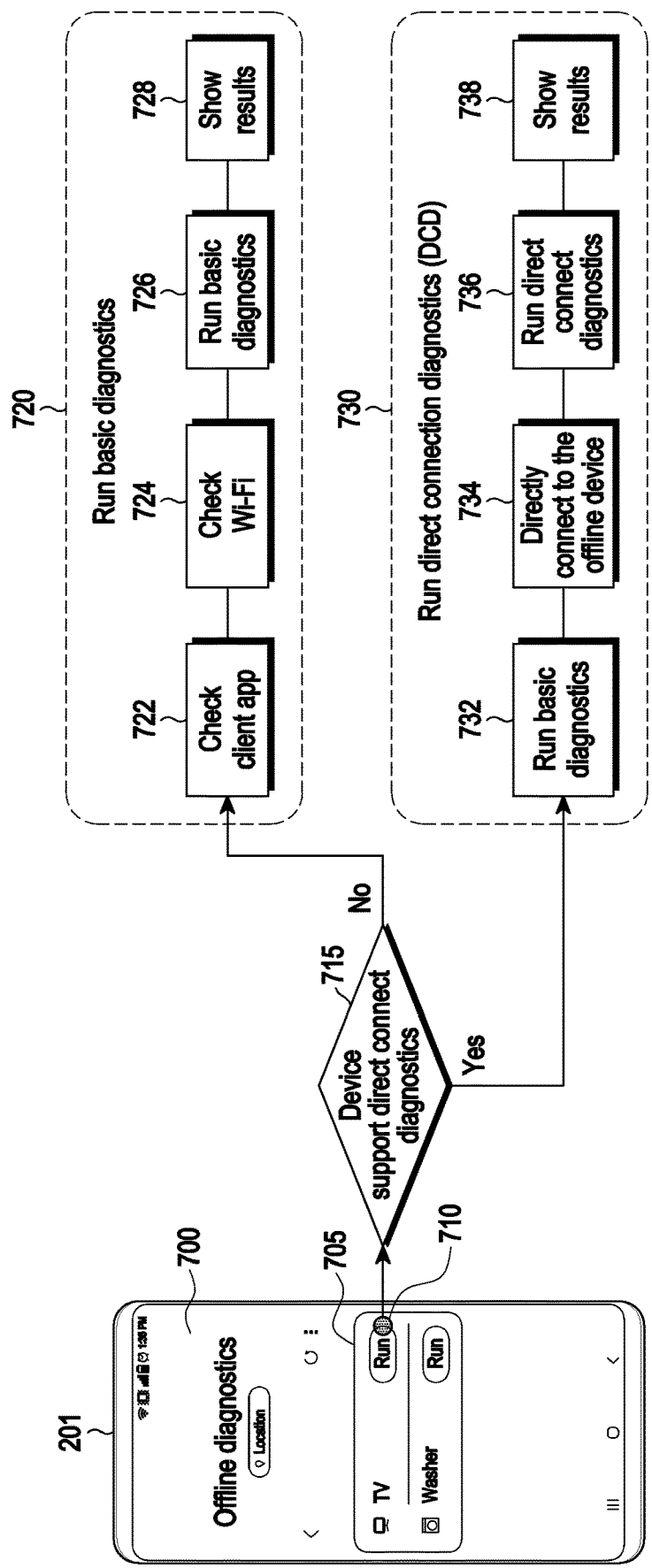
FIG. 7 illustrates a diagnostics procedure according to an embodiment of the disclosure.

FIG. 7 illustrates a diagnostics procedure according to an embodiment of the disclosure.

Referring to FIG. 7, the electronic device 201 may display an offline diagnostics screen 700 including information on at least one controlled device 320 in the offline state. In an embodiment, the offline diagnostics screen 700 may include a state item 705 corresponding to the controlled device 320 (for example, TV). As a user input 710 for the state item 705 is received, the electronic device 201 may determine whether the controlled device 320 supports the DCD in operation 715.

In an embodiment, the electronic device 201 may receive device information of the controlled device 320 from the server 310 to identify whether the controlled device 320 in the offline state supports the DCD and, when the device information includes a DCD support field of the controlled device 320, determine that the controlled device 320 supports the DCD. The device information may include a device profile indicating basic information for device registration and may be defined by a manufacturer. The device profile may be received from the server 310 through, for example, a firmware update in the electronic device 201. In an embodiment, the device information may include diagnostics capability information indicating whether the controlled device 320 supports the DCD.

When the controlled device 320 does not support the DCD, the electronic device 201 may run a basic diagnostics procedure 720. In an embodiment, the basic diagnostics procedure 720 may include an operation 722 of checking a client application (for example, a software version) for the controlled device 320, an operation 724 of checking a Wi-Fi connection by the electronic device 201, an operation 726 of performing predefined basic diagnostics, and an operation 728 of displaying a result.

When the controlled device 320 supports the DCD, the electronic device 201 may run a direct connection diagnostics (DCD) procedure 730. In an embodiment, the DCD procedure 730 may include an operation 732 of performing basic diagnostics, an operation 734 of making a direct connection with the controlled device 320 in the offline state, an operation f 736 of performing predefined direct connection diagnostics, and an operation 738 of displaying a result. Compared to the basic diagnostics procedure 720, the DCD procedure 730 may further include an operation in which the electronic device 201 directly accesses the controlled device 320 and acquires diagnostics-related information (for example, connection information and/or device log data). In order to allow the electronic device 201 to access the controlled device 320, the controlled device 320 may perform an operation of preparing the connection (for example, pressing a specific button of a washing machine).

Table 1 below shows an example of diagnostics capability information according to an embodiment.

TABLE 1

| Attributes | Value | Description |
|---|---|---|
| logType | errCode, dump | Logging scheme |
| endpoint | PIPER, SSM | Logging system endpoint |
| minVersion | 1.0 | Offline diagnostics service version |
| setupId | XXX | Onboarding ID |
| protocolType | Ble_ocf, wifi_https, ble_stdk | Offline diagnostics service protocol |
| mnId | SSS | Manufacturer ID |
| dumpType | File, id | Device log transfer scheme |

In an embodiment, the diagnostics capability information may include at least one of 'logType' attributes, 'endpoint' attributes, 'minVersion' attributes, 'setupId' 'protocolType' attributes, 'mnId' attributes, or 'dumpType'. In an embodiment, the mnId denotes a manufacturer ID, the setupId denotes an onboarding ID assigned when registration in the server 310 is performed, and the protocolType denotes a service protocol (for example, Bluetooth low energy (BLE) or Wi-Fi HTTPS) to be used for offline diagnostics.

In an embodiment, the electronic device 201 may receive setup data including a device image (for example, an appearance image) of the controlled device 320 and a guide phrase from the server 310 by using the mnId and the setupId of the controlled device 320, and configure a guide screen for guiding the communication connection (for example, the D2D connection) between the electronic device 201 and the controlled device 320 on the basis of the setup data. The D2D connection may be an operation of making the connection according to a discovery scheme (for example, based on Soft-AP, BLE, or On IP network) between the electronic device 201 and the controlled device 320. In an embodiment, when the Soft-AP scheme is used, the guide screen may guide the controlled device 320 to the operation in a Soft-AP mode by pressing a specific button of the controlled device 320 or a combination of buttons. In an embodiment, when the BLE scheme is used, the guide screen may guide the controlled device 320 to broadcasting of advertising signals at predetermined intervals. The D2D connection of the BLE scheme may generally include a generic attribute profile (GATT) connection.

In an embodiment, the electronic device 201 may discover the controlled device 320 through BLE scan or Wi-Fi scan according to the protocolType included in the diagnostics capability information and determine whether the controlled device 320 is registered in the server 310 by using device identification information included in the device information of the controlled device 320. When the controlled device 320 is registered in the server 310, the server 310 may manage device information and a state (for example, the online/offline state) of the controlled device 320. In an embodiment, the device identification information may include a media access control (MAC) address. In an embodiment, the device information of the controlled device 320 may be directly transferred from the controlled device 320 to the server 310 during a process of registering the controlled device 320 in the server or may be transferred from the controlled device 320 to the server 310 after the controlled device 320 is registered in the server 310.

Figure 8:
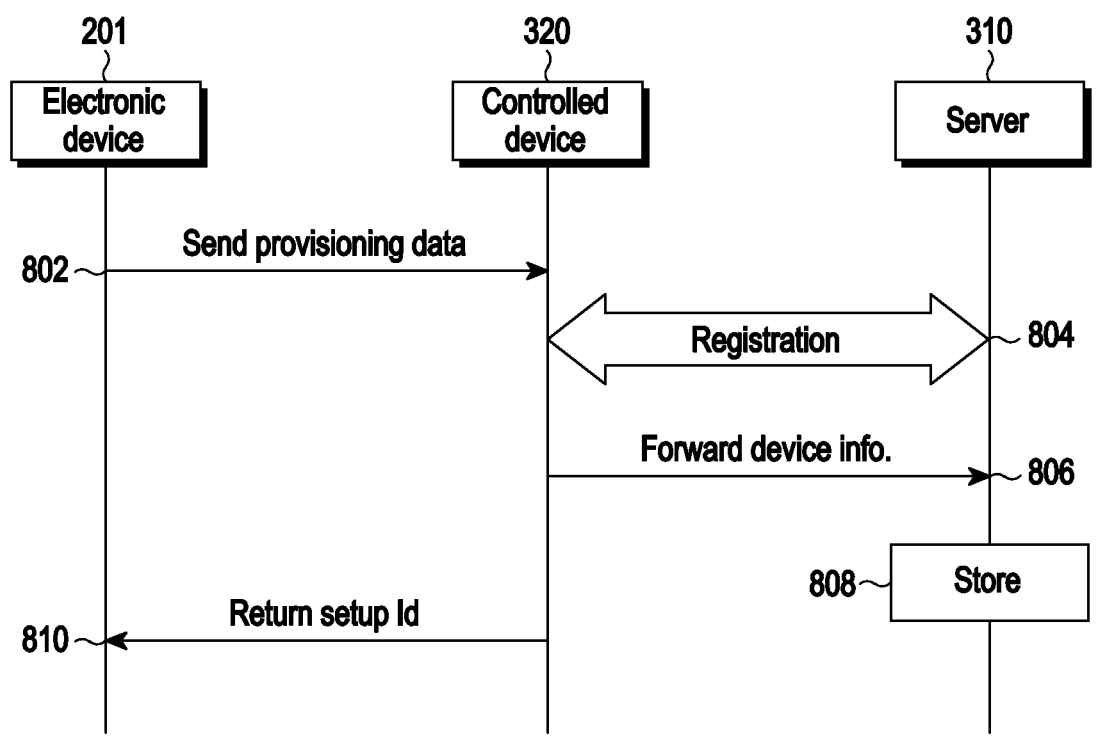
FIG. 8 illustrates a procedure in which the controlled device updates device information in a server according to an embodiment of the disclosure.

FIG. 8 illustrates a procedure in which the controlled device uploads device information to the server according to an embodiment of the disclosure.

Referring to FIG. 8, in operation 802, the electronic device 201 may transmit provisioning data in order to instruct the controlled device 320 to perform a registration procedure for the server 310. In an embodiment, the provisioning data may include terminal information related to the electronic device 201 and information on the user account. In operation 804, the controlled device 320 may perform the registration procedure for the server 310. After the registration procedure or during the registration procedure, the controlled device 320 may transfer device information to the server 310 in operation 806. In an embodiment, the device information may include the terminal information related to the electronic device 201 and information on the user account or may be transferred to the server 310 together with the terminal information and the information on user account.

In operation 808, the server 310 may store the device information. In an embodiment, the server 310 may include at least one of a device backend server handling device onboarding, a metadata server managing metadata information of the controlled device 320, or an inception server managing device identification information. The controlled device 320 may transmit device information including device identification information to the device backend server during the registration procedure. The device backend server may transfer metadata information except for the device identification information to the metadata server, and the device identification information may be transferred to the inception server. In operation 810, the controlled device 320 may transmit a new device ID (e.g., a setup ID) to the electronic device 201.

Figure 9:
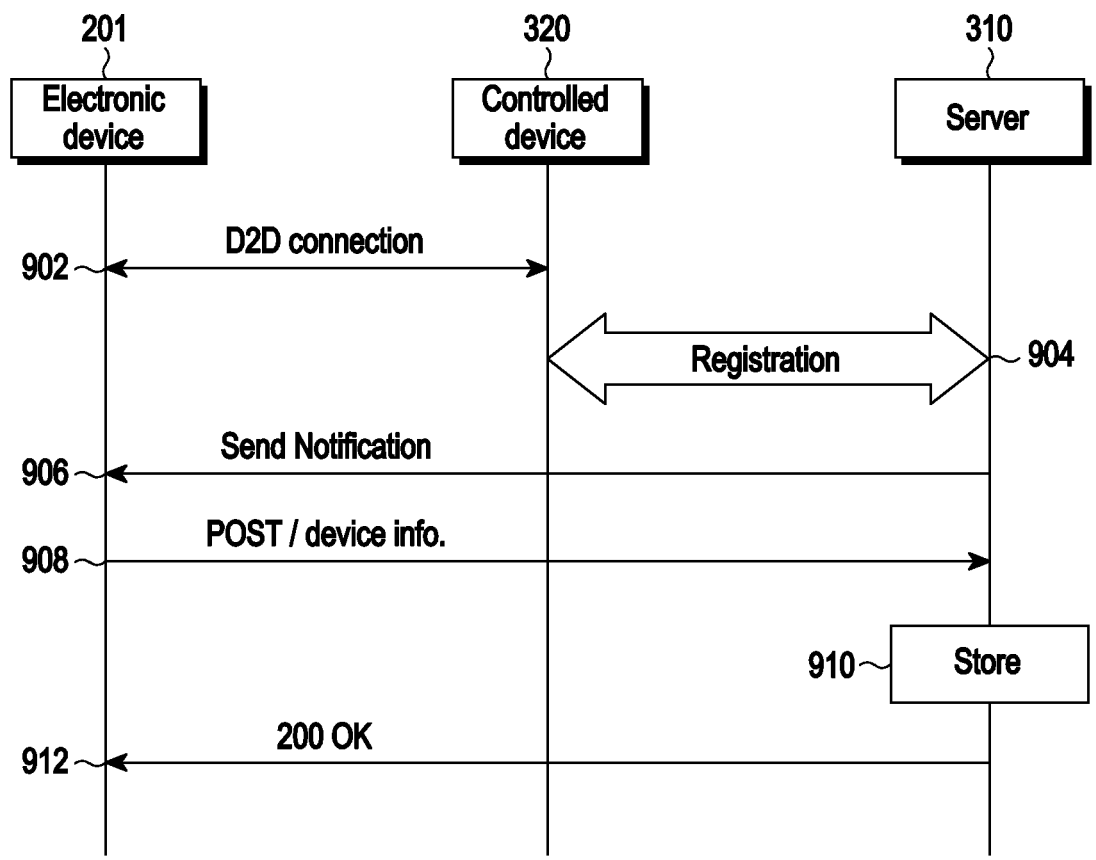
FIG. 9 illustrates a procedure in which the controlled device registers device information in the server according to an embodiment of the disclosure.

FIG. 9 illustrates a procedure in which the electronic device uploads device information of the controlled device to the server according to an embodiment of the disclosure.

Referring to FIG. 9, in operation 902, the electronic device 201 may establish the D2D connection (for example, a Bluetooth connection or a Wi-Fi connection) with the controlled device 320 and acquire device identification information (for example, MAC address) of the controlled device 320 through the D2D connection. In operation 904, the controlled device 320 may be registered in (for example, signed up/signed in) the server 310. When the controlled device 320 does not have a function of directly transferring device information to the server 310 (for example, includes software of an old version), the server 310 may transmit a notification indicating that registration of the controlled device 320 is completed to the electronic device 201 in operation 906. In operation 908, the electronic device 201 may transmit device information of the controlled device 320 (for example, including at least device identification information) to the server 310 in response to the notification. In operation 910, the server 310 may store device information of the controlled device 320 to be associated with the user account of the electronic device 201. In operation 912, the server 310 may transmit a response message (for example, "200-OK") indicating that storage of the device information is completed to the electronic device 201.

Table 2 below shows an example of device identification information according to an embodiment.

TABLE 2

| Attributes | Value |
| --- | --- |
| mnId | "some-mnid" |
| setupId | "some-setupId" |
| modelCode | "some-code" |
| serialNumber | "Some-serial" |
| ssid | "some-ssid" |
| macAddressHash | "wifi":"hash(some-address)," "ble":"hash(some-address)," or "p2p":"hash(some-address)" |

In an embodiment, device identification information may include at least one of mnId, setupId, modelCode, serialNumber, service set identifier (SSID), or macAddressHash. In an embodiment, the mnId denotes a manufacturer ID, the setupId denotes an onboarding ID, the modelCode denotes a device model of the controlled device 320, and the serialNumber denotes a serial number (SN) of the controlled device 320. The macAddressHash may include hash values for at least one MAC address (for example, at least one of a Wi-Fi MAC address, a BLE MAC address, or a point-to-point (P2P) MAC address) of the controlled device 320 according to a protocol type (for example, 'protocolType' in Table 1) supported by the controlled device 320.

In an embodiment, the electronic device 201 may compare the hash value of the MAC address acquired from the controlled device 320 discovered through the BLE scan or the Wi-Fi scan with 'macAddressHash' of the device identification information in order to determine whether the controlled device 320 is registered in the server 310 and, when the hash value is the same as the device identification information, determine that the controlled device 320 is registered in the server 310 and establish the D2D connection with the controlled device 320.

Figure 10:
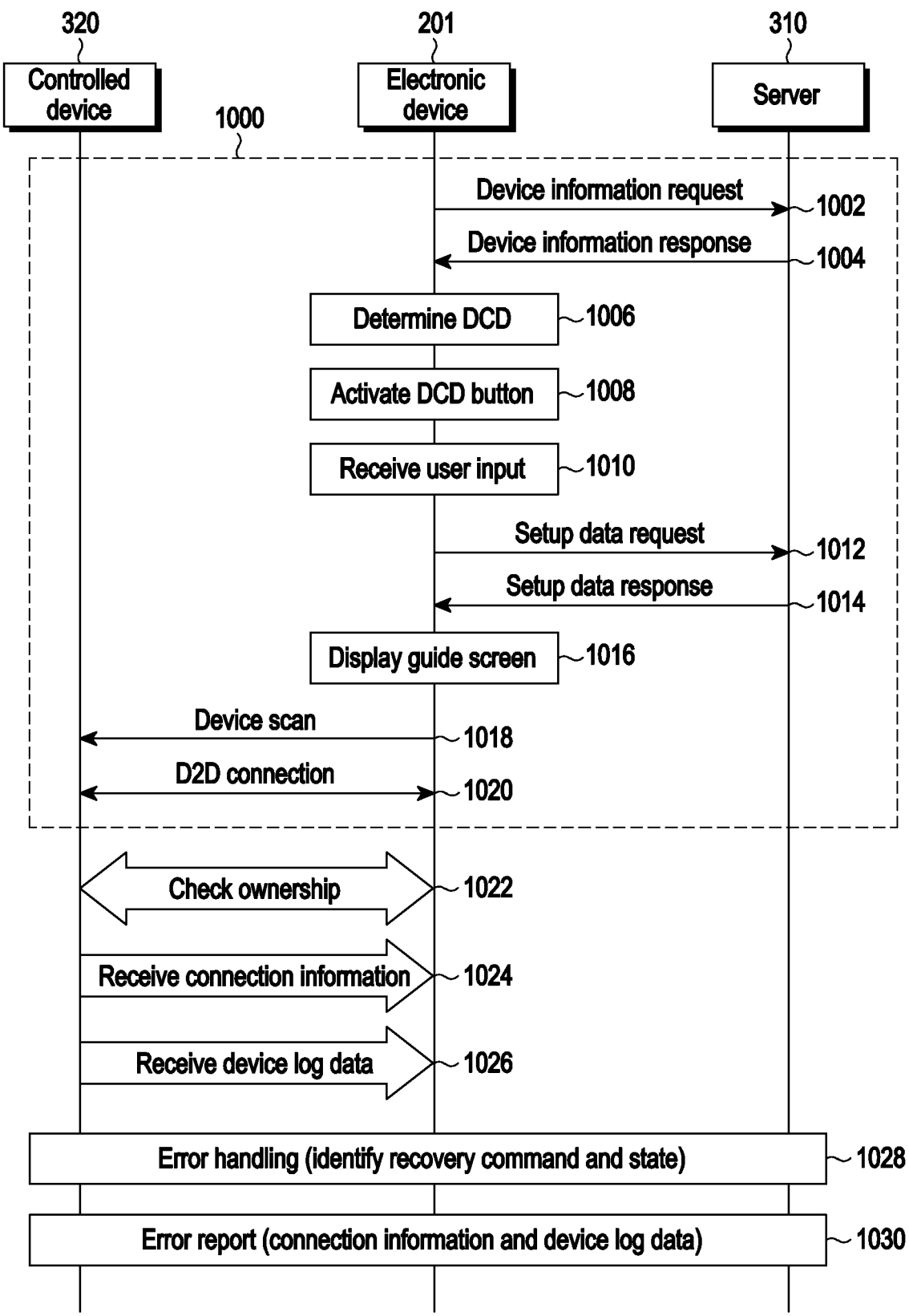
FIG. 10 is a signal sequence diagram illustrating a procedure of performing direct connection diagnostics of the controlled device through the security connection according to an embodiment of the disclosure.

FIG. 10 is a signal sequence diagram illustrating a procedure of performing direct connection diagnostics of the controlled device through the security connection according to an embodiment of the disclosure. At least one of the following operations may be omitted or changed, or orders thereof may be changed.

Referring to FIG. 10, in operation 1000 may be an operation in which the electronic device 201 establishes a communication connection (for example, the D2D connection) with the controlled device 320. In an embodiment, operation 1000 may include at least one of operation 1002, operation 1004, operation 1006, operation 1008, operation 1010, operation 1012, operation 1014, operation 1016, operation 1018, or operation 1020.

In operation 1002, the electronic device 201 may make a request for device information of the controlled device 320 to the server 310. In an embodiment, the electronic device 201 may execute a client application and receive a controlled device list (for example, including the controlled device 320) and state information (for example, online or offline) of the controlled device 320 from the server 310 through the client application, for example, periodically or according to a request. As it is identified that the controlled device 320 is in the offline state on the state information, the electronic device 201 may perform operation 1002. In an embodiment, the electronic device 201 may perform operation 1002 on the basis of reception of a user input (for example, the user input 710) for performing the DCD through the client application. In an embodiment, the electronic device 201 may receive device information and state information of the controlled device 320 from the server 310 periodically or according to a request.

In operation 1004, the electronic device 201 may receive diagnostics capability information and/or device information including device identification information from the server 310. In operation 1006, the electronic device 201 may determine whether the controlled device 320 supports the DCD on the basis of the device information. In an embodiment, the electronic device 201 may recognize that the controlled device 320 is in the offline state on the basis of the state information received together with the device information from the server 310 and perform operation 1006. In an embodiment, the device information may include a DCD support field indicating whether the controlled device 320 supports the DCD, and the electronic device 201 may determine that the controlled device 320 supports the DCD according to a value of the DCD support field or may identify that the DCD support field is included in the device information, so as to determine that the controlled device 320 supports the DCD. In an embodiment, the diagnostics capability information may be configured as shown in Table 1, and the electronic device 201 may determine that the controlled device 320 supports the DCD on the basis of identification that the diagnostics capability information is included in the device information.

In operation 1008, the electronic device 201 may display an object (for example, a DCD execution object or a DCD button) for performing the DCD and, when the controlled device 320 supports the DCD, activate (for example, enable) the D2D execution object. When the controlled device 320 does not support the DCD, the DCD execution object may be deactivated (for example, disabled). In an embodiment, the electronic device 201 may display the DCD execution object for the controlled device 320 when the controlled device 320 supports the DCD, and may not display the DCD execution object for the controlled device 320 when the controlled device 320 does not support the DCD. In operation 1010, the electronic device 201 may receive a user input (for example, a touch) for the (activated or displayed) DCD execution object.

In operation 1012, the electronic device 201 may transmit a request message for setup data (for example, a device image and a guide phrase) required for configuring the guide screen to the server 310. In an embodiment, the request message may include the mnID and/or the setupId acquired from the device information of the controlled device 320. In operation 1014, the electronic device 201 may receive setup data from the server 310. In operation 1016, the electronic device 201 may display a guide screen (for example, the guide screen 1804 of FIG. 18B). In an embodiment, the guide screen may include a device image of the controlled device 320 and a guide phrase. The guide phrase is content for showing the D2D connection to the user according to a device type of the controlled device 320 and may include, for example, "turn on the device and press the button for 3 seconds or longer until the AP appears. In an embodiment, the guide screen may include an object (for example, an input button) for establishing the D2D connection.

In operation 1018, the electronic device 201 may discover the controlled device 320 through device scan. In an embodiment, the user may turn on the controlled device 320 according to the guide screen, and the controlled device 320 may prepare to be discovered by the electronic device 201 according to a protocol type. In an embodiment, the controlled device 320 may broadcast a signal (for example, a BLE advertising signal or a Wi-Fi broadcast signal (that is, a beacon signal)) including its own MAC address at predetermined intervals. In an embodiment, the electronic device 201 may discover the controlled device 320 among devices in a scan list by using an MAC address (for example, 'macAddressHash') included in the device identification information. In operation 1020, the electronic device 201 may establish the D2D connection (for example, the BLE connection or the Wi-Fi connection) with the controlled device 320.

In operation 1022, the electronic device 201 may check ownership of the controlled device 320. In an embodiment, the electronic device 201 may identify that the controlled device 320 is actually owned by the user by identifying that the information (for example, the PIN) received from the controlled device 320 is the same as information (for example, the PIN) input by the user. The electronic device 201 may check ownership of the controlled device 320 and consider the D2D connection as a secure connection. In an embodiment, the electronic device 201 may identify that credential information of the controlled device 320 has been already owned and omit operation 1022. In an embodiment, the electronic device 201 is a member device invited by the owner device performing the registration of the controlled device 320 and may perform operation 1022 on the basis of the credential information received from the owner device. In an embodiment, the electronic device 201 may make a request for the credential information to the owner device and receive the same after operation 1010.

In operation 1024, the electronic device 201 may receive connection information including an offline error code from the controlled device 320 through the D2D connection. In an embodiment, the offline error code may indicate a cause of the offline state of the controlled device 320 and may include, for example, at least one of a cloud error, a network error, a device error, or an unidentified error. In an embodiment, the connection information may include at least one of the fields in <Table 3.

In operation 1026, the electronic device 201 may receive device log data from the controlled device 320 through the D2D connection. The device log data may include an operation log (for example, at least one of power on, function execution, state change, error generation, or power off) of the controlled device 320. In an embodiment, the electronic device 201 may make a request for generating device log data to the controlled device 320 and receive the generated device log data (for example, a dump file of log data) from the controlled device 320.

In operation 1028, the electronic device 201 may perform error handling for the controlled device 320. In an embodiment, the error handling may include an operation of transmitting a recovery command corresponding to the offline error code and the device type of the controlled device 320 to the controlled device 320 and an operation of identifying the connection state of the controlled device 320 to the server 310. In an embodiment, the electronic device 201 may display a help guide to the user on the basis of the offline error code and transmit the recovery command to the controlled device 320 in response to a user input. In an embodiment, after performing self diagnostics in response to the recovery command received from the electronic device 201, the controlled device 320 may attempt the connection with the server 310. The server 310 may identify the connection with the controlled device 320 and transmit a message indicating the connection with the controlled device 320 to the electronic device 201. In an embodiment, in operation 1028, the electronic device 201 may display a help guide according to a value of the offline error code included in connection information and transmit a recovery command corresponding to the offline error code to the controlled device 320.

In operation 1030, the electronic device 201 may transmit an error report message indicating a processing result of the error handling to the server 310. In an embodiment, the error report message may include the offline error code and/or the device log data. In an embodiment, the error report message may be transmitted in response to a user input for the electronic device 201. In an embodiment, the electronic device 201 may disconnect the D2D connection with the controlled device 320 after the error handling is completed.

Table 3 below shows an example of connection information according to an embodiment.

TABLE 3

| Field | Description |
|---|---|
| mnmo | Product separator including model id |
| network_type | Wired/wireless Internet connection state |
| ap_mac | homeAP MAC OUI (organizationally unique identifier) |
| ap_freq | homeAP frequency band |
| ap_protocol | homeAPwifi protocol |
| ap_rssi | homeAP RSSI (receive signal strength indicator) |
| error_code | Error content |
| online_status | Cloud online/offline state of controlled device at time point at which connection information is called |

TABLE 3-continued

| Field | Description |
|---|---|
| ap_security | homeAP security type |
| disconnection_time | Time elapsed after controlled device is changed to offline state |

In an embodiment, the connection information may include at least one of mnmo, network_type, ap_mac, ap_freq, ap_protocol, ap_rssi, error_code, online-status, ap_security, or disconnection_time. In an embodiment, error_code may include one of the values of error codes (for example, offline error codes) for offline diagnostics of the controlled device 320.

Table 4 below shows an example of the offline error code according to an embodiment.

TABLE 4

| Classification | Main value | Cause | Sub value | Detailed cause |
|---|---|---|---|---|
| Cloud Error | CE01 | DNS to SmartThings Cloud address has failed | 1 | Private IP response |
| | CE80 | Session connection to SmartThings Cloud has failed | 2 | |
| | CE20 | Sign-in has failed | 1 | Send fail |
| | | | 2 | Failure response value |
| | | | 3 | Timeout |
| | CE82 | Sign-out has failed | 1 | Send fail |
| | | | 2 | Failure response value |
| | | | 3 | Timeout |
| | CE83 | Keep alive resource discovery has failed | 1 | send fail |
| | | | 2 | Failure response value |
| | | | 3 | Timeout |
| | CE84 | Keep alive request has failed | 1 | Send fail |
| | | | 2 | Failure response value |
| | | | 3 | Timeout |
| | CE60 | Access token refresh has failed | 1 | Send fail |
| | | | 2 | Failure response |
| | | | 3 | Timeout |
| | CE90 | Device reset | | |
| | CE70 | Rate Limit | | |
| Network Error | NE11 | Connection to router has failed | 1 | AP not found |
| | | | 2 | Authentication has failed |
| | | | 3 | Association has failed |
| | | | 4 | Password mismatch (same as EAPOL (EAP encapsulation over LAN) failure |
| | | | 5 | OPEN-password exists |
| | | | 6 | Wi-Fi module detach |
| | NE30 | Connection to router is disconnected | 1 | Beacon loss |
| | | | 2 | De-authenticated |
| | NE12 | Router DHCP has failed | 1 | Discovery + Request timeout |
| | NE50 | Connection to Ethernet router has failed | 1 | ethernet cable detach |
| | | | 2 | dhcp has failed |
| | | | 3 | ethernet router check has |

TABLE 4-continued

| Classification | Main value | Cause | Sub value | Detailed cause |
|---|---|---|---|---|
| Device specific Error | DS01 | Non-use for long period | 1 | failed (arping) Non-use for long period |
| | DS02 | Power-on is not supported | 1 | Power-on is not supported |
| | | | 2 | Configuration of "power on by mobile" is turned off |
| | | | 3 | When old TV is connected to wired LAN |
| | DS03 | Device error | 1 | Wakeup timer error |
| | | | 2 | cold power off |
| | | | 3 | SES Disconnection |
| Unknown Error | UE01 | or Unknown Error/ Default Error code | | Unknown Error |

Figure 11:
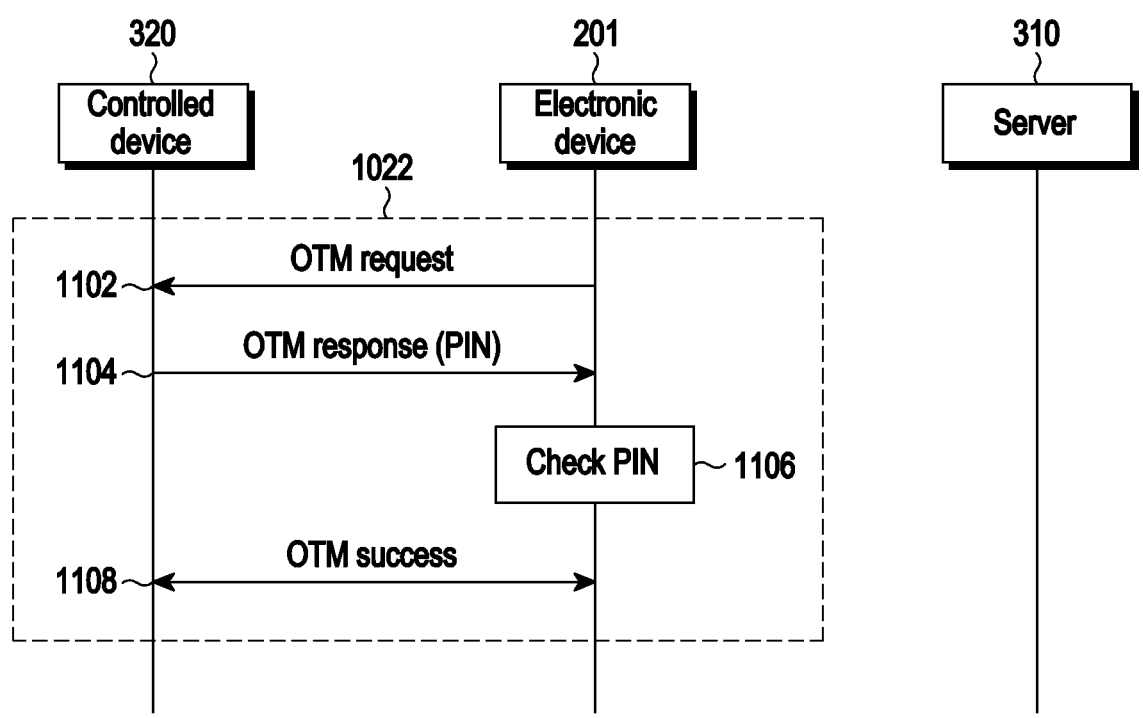
FIG. 11 is a signal sequence diagram illustrating a procedure of checking ownership of the controlled device according to an embodiment of the disclosure.

FIG. 11 is a signal sequence diagram illustrating a procedure of checking ownership of the controlled device according to an embodiment of the disclosure. At least one of the operations described below in embodiments may be omitted or changed, or orders thereof may be changed.

Referring to FIG. 11, in operation 1022 (for example, operation 1022 of FIG. 10), the electronic device 201 may check ownership of the controlled device 320. In an embodiment, operation 1022 may include at least one of operation 1102, operation 1104, operation 1106, or operation 1108. In an embodiment, the electronic device 201 may check ownership through operation 1022 in order to receive connection information and device log data through the D2D connection.

In operation 1102, the electronic device 201 may transmit an ownership transfer method (OTM) request message to the controlled device through the D2D connection (for example, the D2D connection established in operation 1020 of FIG. 10). The OTM is a procedure of verifying whether the controlled device 320 is actually owned by the user, and may use at least one of, for example, user confirm, QR (quick response) confirm, random PIN, serial number confirm, or ultrasound confirm. In an embodiment, when the random PIN scheme is used, the controlled device 320 may transmit an OTM response message including a randomly generated PIN (for example, a first PIN) to the electronic device 201 in operation 1104. In an embodiment, the controlled device 320 may display the first PIN on its own display module (not shown) so that the user can identify the first PIN.

In operation 1106, the electronic device 201 may display an input screen on the display module 260 and receive a second PIN for checking ownership of the controlled device 320 from the user through the input screen. The electronic device 201 may compare the first PIN received through the OTM response message with the second PIN and, when the first PIN is the same as the second PIN, determine that the controlled device 320 is actually owned by the user. In operation 1108, the electronic device 201 may complete check of the ownership by sharing credential information with the controlled device 320 through an OTM success message.

In an embodiment, each of the electronic device 201 and the controlled device 320 may store the credential information during the procedure in which the controlled device 320 is registered in the server 310. The credential information may be transferred to the controlled device 320 through the OTM request message of operation 1102, and the controlled device 320 may identify that the credential information is the same as credential information which the controlled device 320 has, and transmit the OTM response message in operation 1104. In an embodiment, when the credential information is used, the user confirm may be omitted and the OTM response message may not include the PIN. The electronic device 201 may omit the PIN checking of operation 1106 and determine that the ownership of the controlled device 320 is checked on the basis of reception of the OTM response message.

In an embodiment, the electronic device 201 may be the owner device performing the procedure of registering the controlled device 320 in the server 310 and perform check of the ownership of operation 1022 by using the credential information generated during the registration procedure. In an embodiment, the electronic device 201 may be a member device invited by the owner device or allowed by the owner device, and may receive credential information from the owner device and perform check of the ownership of operation 1022 by using the credential information. In an embodiment, the controlled device 320 may store each piece of credential information for the owner device and at least one member device. In an embodiment, the electronic device 201 may be a member device and may perform check of the ownership of operation 1022 by using the PIN input by the user. In an embodiment, when the electronic device 201 has already checked the ownership of the controlled device 320, operation 1022 may be omitted.

In an embodiment, when check of the ownership is completed through operation 1022, the electronic device 201 may store a device ID of the controlled device 320, and the controlled device 320 may store a terminal ID (mobile ID) of the electronic device 201. In an embodiment, the electronic device 201 may identify a device ID of the controlled device 320 while the D2D connection of operation 1020 is established and, when the device ID of the controlled device 320 has been already stored, determine to omit operation 1022.

Figure 12:
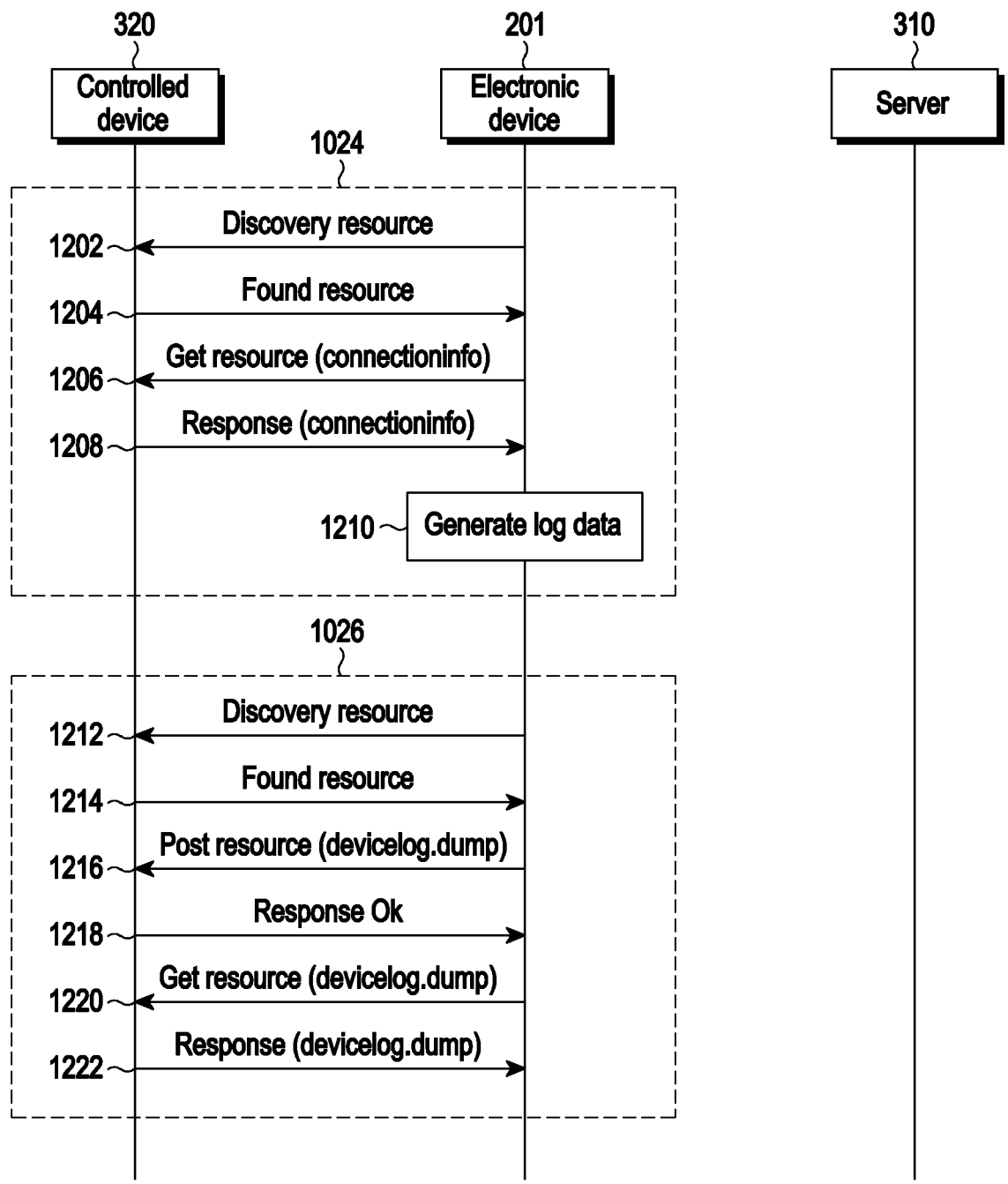
FIG. 12 is a signal sequence diagram illustrating a procedure of receiving connection information and device log data according to an embodiment of the disclosure.

FIG. 12 is a signal sequence diagram illustrating a procedure of receiving connection information and device log data according to an embodiment of the disclosure. At least one of the operations described below in embodiments may be omitted or changed, or orders thereof may be changed.

Referring to FIG. 12, in operation 1024 (for example, operation 1024 of FIG. 10), the electronic device 201 may receive connection information from the controlled device 320 through the D2D connection (for example, the D2D connection established in operation 1020 of FIG. 10) (for example, the BLE connection) and proceed to operation 1026. In an embodiment, operation 1024 may include at least one of operation 1202, operation 1204, operation 1206, operation 1208, or operation 1210.

In operation 1202, the electronic device 201 may transmit a Discovery resource message for asking the controlled device 320 about whether the controlled device 320 has the connection information. In operation 1204, the controlled device 320 may transmit a Found resource message indicating that the controlled device 320 has the connection information to the electronic device 201. In operation 1206, the electronic device 201 may transmit a Get resource message making a request for the connection information to the controlled device 320. In operation 1208, the controlled device 320 may transmit a Response message including the connection information to the electronic device 201. In operation 1210, the electronic device 201 may generate log data including the connection information. In an embodiment, the log data may include a terminal log (mobile log) of the electronic device 201.

In operation 1026 (for example, operation 1026 of FIG. 10), the electronic device 201 may receive device log data from the controlled device 320 through the D2D connection (for example, the D2D connection established in operation 1020) (for example, the BLE connection). In an embodiment, operation 1026 may include at least one of operation 1212, operation 1214, operation 1216, operation 1218, operation 1220, or operation 1222.

In operation 1212, the electronic device 201 may transmit a Discovery resource message for asking the controlled device 320 about whether the controlled device 320 has the device log data. In operation 1214, the controlled device 320 may transmit a Found resource message indicating that the controlled device 320 has the device log data to the electronic device 201. In operation 1216, the electronic device 201 may transmit a Post resource message making a request for generating device log data including a timestamp (for example, a dump file of the device log) to the controlled device 320. In operation 1218, the controlled device 320 may generate the device log data and transmit a Response Ok message to the electronic device 201.

In operation 1220, the electronic device 201 may transmit a Get resource message making a request for the device log data to the controlled device 320. In operation 1222, the controlled device 320 may transmit a Response message including the device log data to the electronic device 201.

Figure 13:
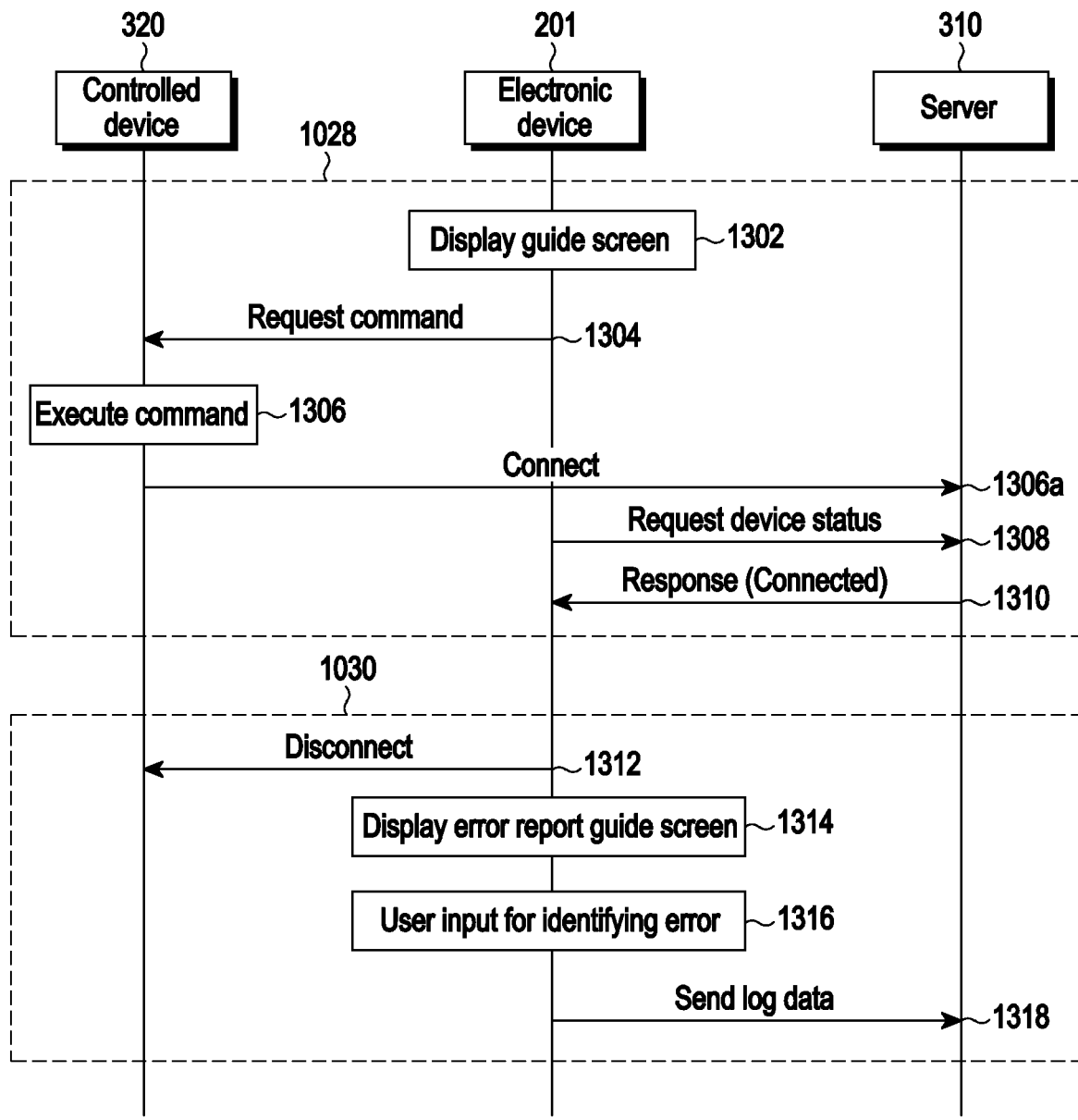
FIG. 13 is a signal sequence diagram illustrating error handling and an error report according to an embodiment of the disclosure.

FIG. 13 is a signal sequence diagram illustrating error handling and an error report according to an embodiment of the disclosure. At least one of the operations described below in embodiments may be omitted or changed, or orders thereof may be changed.

Referring to FIG. 13, in operation 1028 (for example, operation 1028 of FIG. 10), the electronic device 201 may hand an offline error of the controlled device 320 according to the offline error code acquired in operation 1024 (for example, operation 1024 of FIG. 10). In an embodiment, operation 1028 may include at least one of operation 1302, operation 1304, operation 1306, operation 1306a, operation 1308, or operation 1310.

In operation 1302, the electronic device 201 may display a help guide screen (for example, a screen 1904 of FIG. 19B, a screen 2002 of FIG. 20, or a screen 2102 of FIG. 21) including a help guide corresponding to the offline error code. In an embodiment, the help guide screen may include a guide phrase, for example, "Wi-Fi password is incorrect," "Wi-Fi router not found," or "Turn off the device and turn it on again" according to the offline error codes shown in Table 4. In an embodiment, the help guide screen may include an object (for example, an input button of "Continue on TV" of FIG. 20 or an input button of "Reboot" of FIG. 21) indicating transmission of a recovery command to the controlled device 320.

The electronic device 201 may transmit a message (for example, a "Request command") including a recovery command corresponding to the offline error code to the controlled device 320 on the basis of reception of a user input for the input button on the help guide screen in operation 1304. The recovery command may indicate a specific function which should be performed for restoring the offline state in the controlled device 320, for example, Wi-Fi reconnection or rebooting. In operation 1306, the controlled device 320 may perform a function (for example, Wi-Fi reconnection or rebooting) corresponding to the recovery command. In an embodiment, when the controlled device 320 has a large display screen such as a TV, the recovery command may indicate "continue on TV," and the controlled device 320 may directly perform error handing such as connection check by linking with the user in response to the recovery command in operation 1306. In operation 1306a, the controlled device 320 may be connected with the server 310 again after solving the offline error by the error handling. When the controlled device 320 is normally connected to the server 310, the server 310 may update the state of the controlled device 320 to "connected" (or online).

In operation 1308, the electronic device 201 may transmit a message (for example, a "Request device status") making a request for the device state to the server 310 after transmitting the recovery command. In operation 1310, the server 310 may identify whether the controlled device 320 is connected to the server 310 and transmit a state message (for example, "Response (Connected)") including the result (for example, connected or not connected) to the electronic device 201.

In operation 1030 (for example, operation 1030 of FIG. 10), the electronic device 201 may report the result of error handling of operation 1028 to the server 310. In an embodiment, operation 1030 may include at least one of operation 1312, operation 1314, operation 1316, or operation 1318.

In operation 1312, the electronic device 201 may disconnect the connection with the controlled device 320 according to identification that the controlled device 320 is connected to the server 310 through the state message of operation 1310. In operation 1314, the electronic device 201 may display an error report guide screen for guiding an error report. In an embodiment, the error report guide screen may include an object (for example, an error report button 1906) making a request for transmitting the error report to the server 310 by the electronic device 201. In operation 1316, the electronic device 201 may receive a user input through the error report button of the error report guide screen. In operation 1318, the electronic device 201 may transmit an error report message (for example, "Send log data") to the server 310 in response to the user input. In an embodiment, the error report message may include at least one of connection information acquired in operation 1024 (for example, operation 1024 of FIG. 10), device log data acquired in operation 1026 (for example, operation 1026 of FIG. 10), or information related to the error handling result of operation 1028. The server 310 may store the connection information and the device log data.

Figure 14:
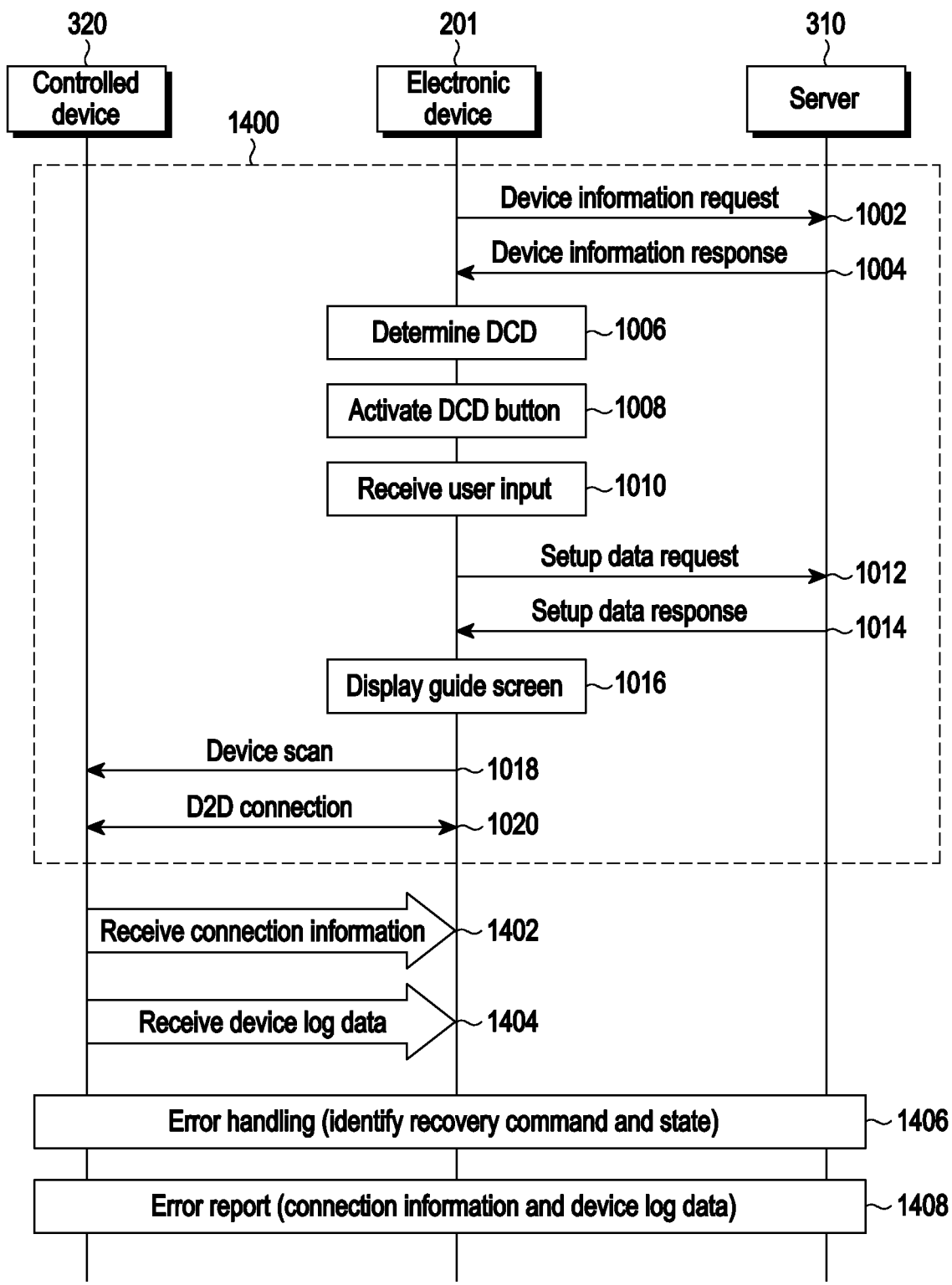
FIG. 14 is a signal sequence diagram illustrating a procedure of performing direct connection diagnostics of the controlled device through a unsecure connection according to an embodiment of the disclosure.

FIG. 14 is a signal sequence diagram illustrating a procedure of performing direct connection diagnostics of the controlled device through a unsecure connection according to an embodiment of the disclosure. At least one of the operations described below in embodiments may be omitted or changed, or orders thereof may be changed.

Referring to FIG. 14, operation 1400 may be an operation in which the electronic device 201 establishes a communication connection (for example, the D2D connection) with the controlled device 320. In an embodiment, operation 1400 may include at least one of operation 1002, operation 1004, operation 1006, operation 1008, operation 1010, operation 1012, operation 1014, operation 1016, operation 1018, or operation 1020 illustrated in FIG. 10. In an embodiment, the electronic device 201 may not check the ownership since the electronic device 201 does not have credential information for the controlled device 320. In an embodiment, the electronic device 201 does not support multi-ownership and credential information associated with the check of the existing ownership is reset in the server 310, and thus the electronic device 201 may proceed to operation 1402 without checking the ownership.

In operation 1402, the electronic device 201 may receive connection information including the offline error code from the controlled device 320 through the D2D connection established in operation 1400. In an embodiment, the connection information may include at least one of the fields in Table 3. In an embodiment, since the D2D connection is considered as a unsecure connection in which the ownership is not checked, the connection information may not include ap_mac. In an embodiment, the offline error code may include one of the error code values of Table 4.

In operation 1404, the electronic device 201 may receive device log data from the controlled device 320 through the D2D connection. In an embodiment, the electronic device 201 may make a request for generating device log data to the controlled device 320 and receive the generated device log data (for example, a dump file of log data) from the controlled device 320.

In operation 1406, the electronic device 201 may perform error handling for the controlled device 320. In an embodiment, the error handling may include an operation of transmitting a recovery command corresponding to the offline error code and the device type of the controlled device 320 to the controlled device 320 and an operation of identifying the connection state of the controlled device 320 to the server 310. In an embodiment, the electronic device 201 may display a help guide to the user on the basis of the offline error code and transmit the recovery command to the controlled device 320 in response to a user input.

In an embodiment, since the D2D connection established in operation 1400 is considered as the unsecure connection in which the ownership is not checked, the controlled device 320 may perform the user confirm in response to a recovery command from the electronic device 201 in operation 1406. In an embodiment, the controlled device 320 may display a popup screen for the user to confirm before performing a function corresponding to the recovery command and may perform the function when receiving a user input of approving the execution of the function through the popup screen. In an embodiment, operation 1406 may be the same as or similar to operation 1028 of FIG. 13.

In operation 1408, the electronic device 201 may transmit an error report message indicating a processing result of the error handling to the server 310. In an embodiment, the error report message may include the offline error code and/or the device log data. In an embodiment, the error report message may be transmitted in response to a user input for an error report button (for example, the error report button 1906) displayed in the electronic device 201. In an embodiment, the electronic device 201 may disconnect the D2D connection with the controlled device 320 after the error handling is completed. In an embodiment, operation 1408 may be the same as or similar to operation 1030 of FIG. 13.

Figure 15:
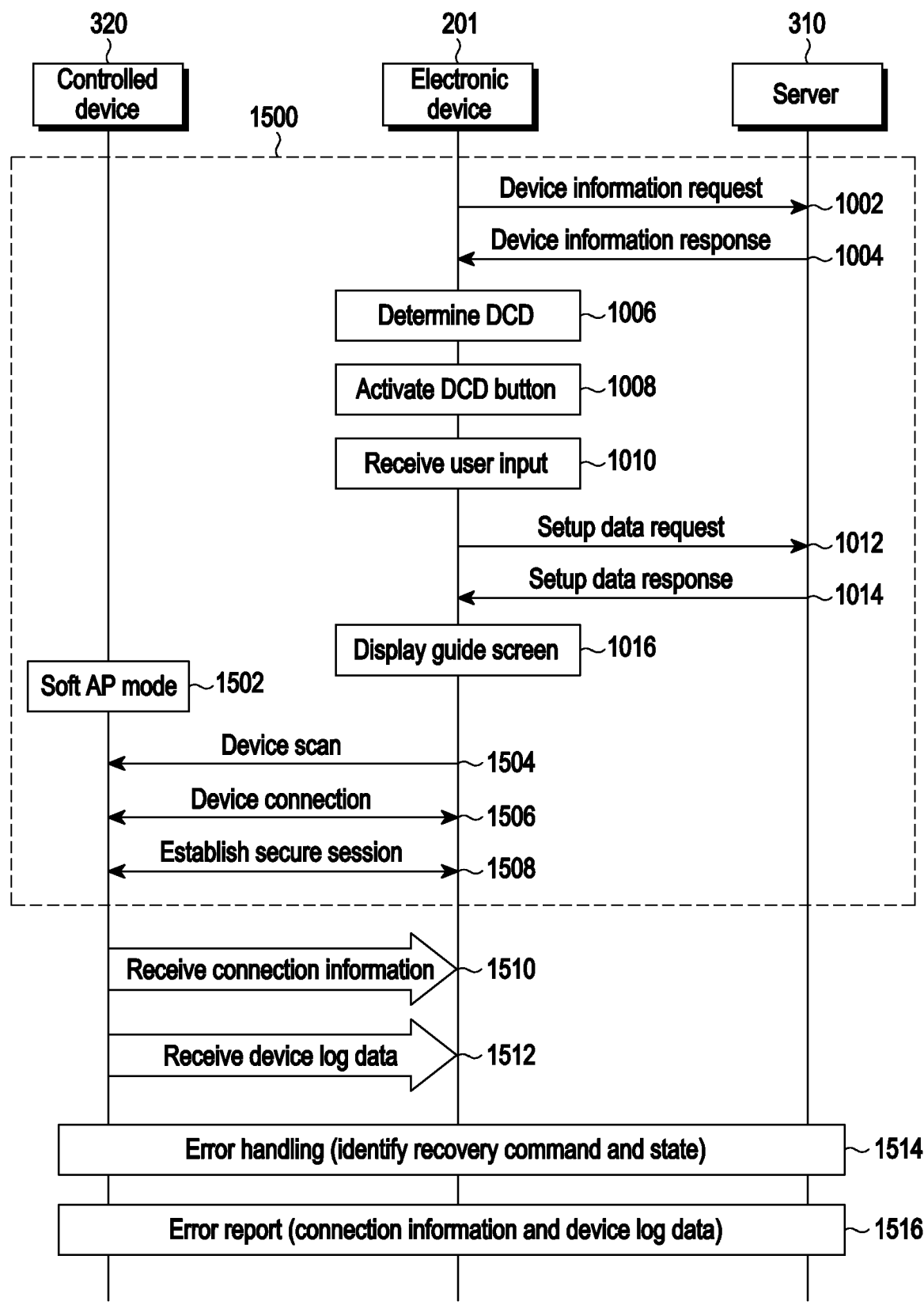
FIG. 15 is a signal sequence diagram illustrating a procedure of performing direct connection diagnostics of the controlled device by using a soft access point (AP) mode according to an embodiment of the disclosure.

FIG. 15 is a signal sequence diagram illustrating a procedure of performing direct connection diagnostics of the controlled device by using a soft AP mode according to an embodiment of the disclosure. At least one of the operations described below in embodiments may be omitted or changed, or orders thereof may be changed.

Referring to FIG. 15, operation 1500 may be an operation in which the electronic device 201 establishes a communication connection (for example, the D2D connection) with the controlled device 320. In an embodiment, operation 1400 may include at least one of operation 1002, operation 1004, operation 1006, operation 1008, operation 1010, operation 1012, operation 1014, or operation 1016 illustrated in FIG. 10, and at least one of operation 1502, operation 1504, operation 1506, or operation 1508. In an embodiment, the guide screen of operation 1016 may include a guide phrase describing a scheme of changing the controlled device 320 to the soft AP mode. The user may configure the controlled device 320 as the soft AP mode through manual control according to the guide phrase.

In operation 1502, the controlled device 320 may enter the soft AP mode and broadcast Wi-Fi broadcast signals (for example, beacon signals) at predetermined intervals. In an embodiment, the controlled device 320 may start operating as an HTTP server in order to transmit device log data.

In operation 1504, the electronic device 201 may discover the controlled device 320 through device scan. In an embodiment, the electronic device 201 may target the controlled device 320 by identify whether identification information (for example, a MAC address and/or a serial number) acquired from the beacon signals broadcasted from the controlled device 320 is the same as identification information included in the device identification information acquired in operation 1004. In operation 1506, the electronic device 201 may establish the D2D connection (for example, a Wi-Fi connection) with the controlled device 320. In operation 1508, the electronic device 201 may establish a certificate-based secure session (secure session with certificate) with the controlled device 320 in the D2D connection.

In operation 1510, the electronic device 201 may receive connection information including the offline error code from the controlled device 320 through the D2D connection established in operation 1500. In an embodiment, the connection information may include at least one of the fields in Table 3. In an embodiment, the offline error code may include one of the error code values of Table 4.

In operation 1512, the electronic device 201 may receive device log data from the controlled device 320 through the D2D connection. In an embodiment, the electronic device 201 may make a request for generating device log data to the controlled device 320 and receive the generated device log data (for example, a dump file of log data) from the controlled device 320.

In operation 1514, the electronic device 201 may perform error handling for the controlled device 320. In an embodiment, operation 1514 may be the same as or similar to operation 1028 of FIG. 13. In operation 1516, the electronic device 201 may transmit an error report message indicating a processing result of the error handling to the server 310. In an embodiment, operation 1516 may be the same as or similar to operation 1030 of FIG. 13.

Figure 16:
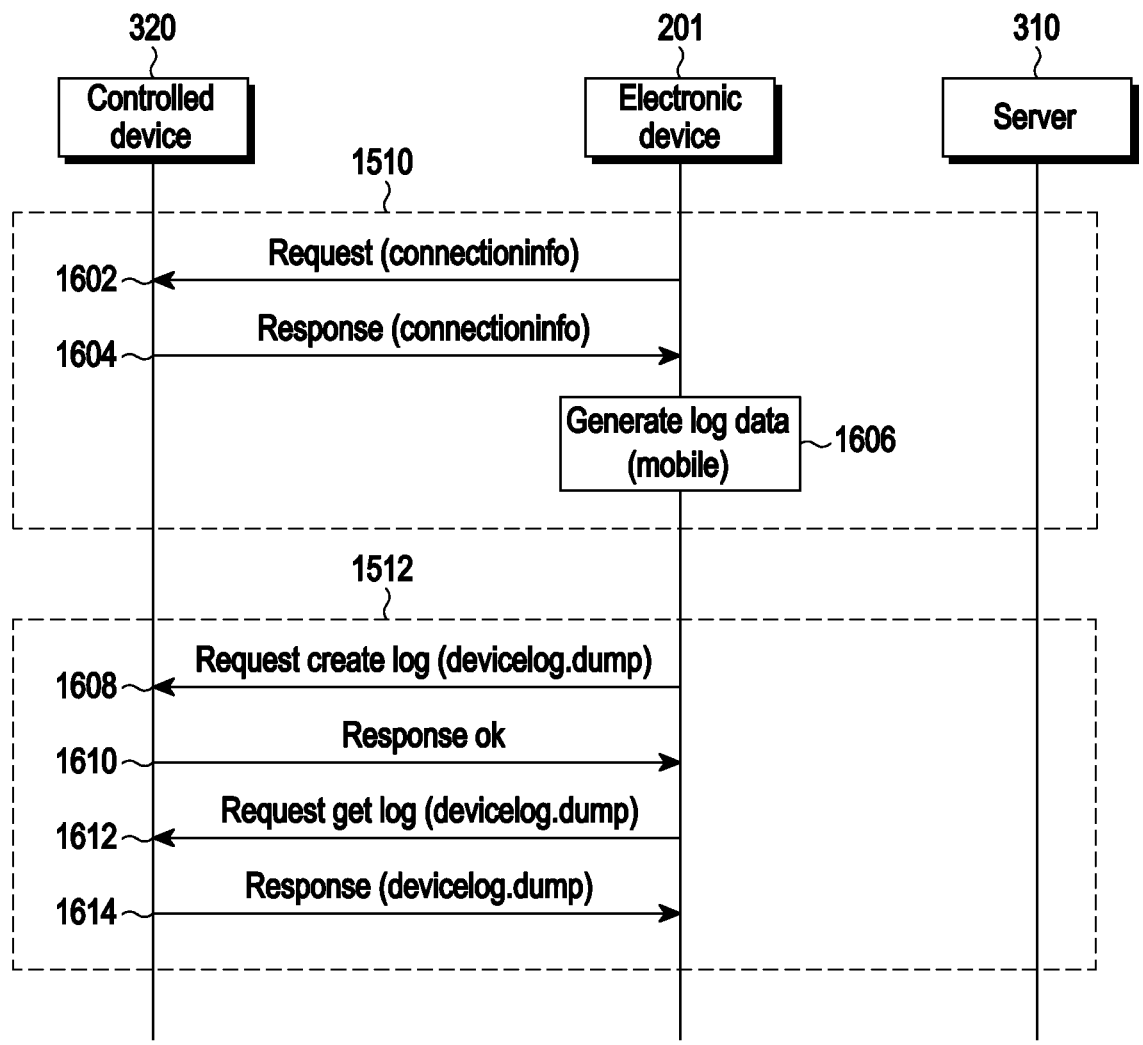
FIG. 16 is a signal sequence diagram illustrating a procedure of receiving connection information and device log data according to an embodiment of the disclosure.

FIG. 16 is a signal sequence diagram illustrating a procedure of receiving connection information and device log data according to an embodiment of the disclosure. At least one of the operations described below in embodiments may be omitted or changed, or orders thereof may be changed.

Referring to FIG. 16, in operation 1510, the electronic device 201 may receive connection information from the controlled device 320 through the D2D connection (For example, the D2D connection established in operation 1020 of FIG. 10) (for example, an HTTP secure session in the Wi-Fi connection). In an embodiment, operation 1510 may include at least one of operation 1602, operation 1604, or operation 1606.

In operation 1602, the electronic device 201 may transmit a request message (for example, "Request (connectioninfo)") making a request for connection information to the controlled device 320. In an embodiment, the electronic device 201 may insert an API (application programming interface) key and/or a device ID into an HTTPS header of the request message for permission check. The controlled device 320 may compare the API key and/or the device ID with device information which the controlled device 320 stores and, when the API key and/or device ID is the same as the device information, proceed to operation 1604.

In operation 1604, the controlled device 320 may transmit a response message (for example, "Response (connection-info)") including connection information to the electronic device 201. In operation 1606, the electronic device 201 may generate log data including the connection information. In an embodiment, the log data may include a terminal log (mobile log) of the electronic device 201.

In operation 1512, the electronic device 201 may receive device log data from the controlled device 320 through the D2D connection (for example, the HTTP secure session in the Wi-Fi connection) established in operation 1500 (for example, operation 1500 of FIG. 15). In an embodiment, operation 1512 may include at least one of operation 1608, operation 1610, operation 1612, or operation 1614.

In operation 1608, the electronic device 201 may transmit a request message (for example, "Request create log (devicelog.dump)") making a request for generating device log data to the controlled device 320. In operation 1610, the controlled device 320 may generate the device log data and transmit a response message (for example, "Response ok") to the electronic device 201. In operation 1612, the electronic device 201 may transmit a request message (for example, "Request get log (devicelog.dump)") making a request for the device log data including a timestamp (for example, a dump file of the device log) to the controlled device 320. In operation 1614, the controlled device 320 may transmit a response message including the device log data (for example, "Response (devicelog.dump)") to the electronic device 201. In an embodiment, the request message of operation 1608 and/or operation 1612 may include the API key and/or the device ID which the electronic device 201 knows, and the controlled device 320 may perform permission check of the electronic device 201 on the basis of the API key and/or the device ID and transmit the response message of operation 1610 and/or operation 1614.

In an embodiment, the recovery command which the electronic device 201 transmits to the controlled device 320 in at least one of operation 1028, operation 1406, or operation 1514 may include a function for performing a help corresponding to the offline error code. In an embodiment, the recovery command may indicate restart of the controlled device 320.

In an embodiment, when the offline error code is NE11-1, NE11-4, NE11-5 of Table 4, the electronic device 201 may make a request for a Wi-Fi scan list to which the controlled device 320 can be connected to the controlled device 320 and receive a Wi-Fi scan list including at least one Wi-Fi network from the controlled device 320. The Wi-Fi scan list may include at least one of a supported frequency (for example, at least one of 2.4 gigahertz (GHz), 5 GHz, or 6 GHz), a supported auth type, or Wi-Fi scan information. In an embodiment, the Wi-Fi scan information may include at least one of an SSID, an authentication type, an encryption type, a MAC address, a frequency, or an RSSI.

In an embodiment, the electronic device 320 may display the Wi-Fi scan list and, when the user selects at least one AP in the Wi-Fi scan list, insert Wi-Fi information related to the selected AP into the recovery command, and transmit the recovery command to the controlled device 320. The Wi-Fi information may include at least one of, for example, an SSID, a password, an authentication type, or an encryption type. In an embodiment, the recovery command may indicate a Wi-Fi update using the Wi-Fi information.

According to embodiments of the disclosure, an electronic device for managing a controlled device and a method of operating the same may provide the user with offline causes of the controlled device through direct connection diagnostics of the controlled device in the offline state and provide a solution suitable for an error situation of the controlled device for help diagnostics of the user.

Figure 17:
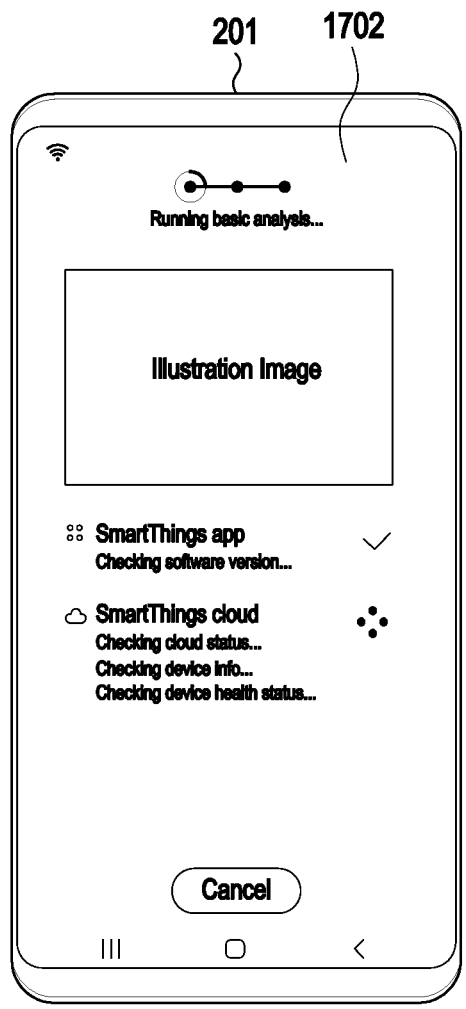
FIG. 17 illustrates a user interface screen in which basic diagnostics is performed according to an embodiment of the disclosure.

FIG. 17 illustrates a user interface screen in which basic diagnostics is performed according to an embodiment of the disclosure.

Referring to FIG. 17, when the controlled device 320 does not support direct connection diagnostics, the electronic device 201 may display a basic diagnostic execution screen 1702 on the display module 260 while running a basic diagnostics procedure (for example, operation 720 of FIG. 7). Through the basic diagnostics procedure, the electronic device 201 may check at least one of a software version of the client application, a cloud state, device information, or a device operation state.

Figure 18A:
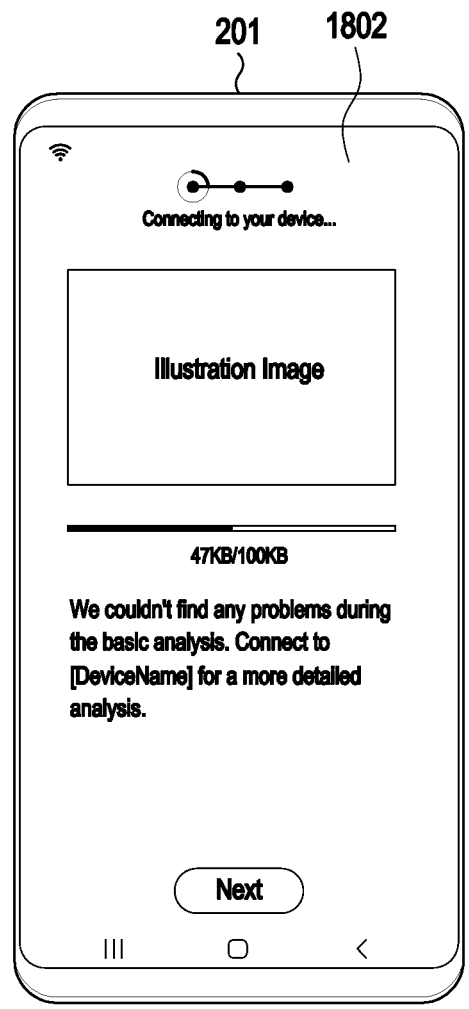
FIGS. 18A, 18B, and 18C illustrate user interface screens in which direct connection diagnostics is performed according to various embodiments of the disclosure.
Figure 18B:
Figure 18C:

FIGS. 18A, 18B, and 18C illustrate user interface screens in which direct connection diagnostics is performed according to various embodiments of the disclosure.

Referring to FIG. 18A, when the controlled device 320 supports direct connection diagnostics, the electronic device 201 may display a screen 1802 on the display module 260 while running a direct connection diagnostics procedure (for example, operation 730 of FIG. 7). In an embodiment, the electronic device 201 may perform basic diagnostics (for example, operation 732 of FIG. 7) included in the direct connection diagnostics procedure 730 and, when no problem is found on the basis of the execution result of the basic diagnostics 732, display the screen 1802. For example, the screen 1802 may include a phrase guiding the connection to the controlled device 320 for the direct connection diagnostics together with a phrase indicating that no problem is found on the basis of the execution result of the general diagnostics 732. In an embodiment, the first screen 1802 may be displayed by the electronic device 201 after operation 1010.

Referring to FIG. 18B, the electronic device 201 may display a guide screen 1804 generated on the basis of setup data received from the server 310 on the display module 260. In an embodiment, the guide screen 1804 may include a device image of the controlled device 320 and a guide phrase (for example, "Turn on the device and press the button for 3 seconds or longer until the AP appears"). In an embodiment, the guide screen 1804 may be displayed by the electronic device 201 in operation 1016.

Referring to FIG. 18C, the electronic device 201 may receive a user input making a request for the connection to the controlled device 320 through the guide screen 1804 and display a screen 1806 on the display module 260. In an embodiment, the screen 1806 may include a phrase indicating that the connection with the controlled device 320 is being made. In an embodiment, the screen 1806 may be displayed during operation 1020 or operation 1506.

Figure 19A:
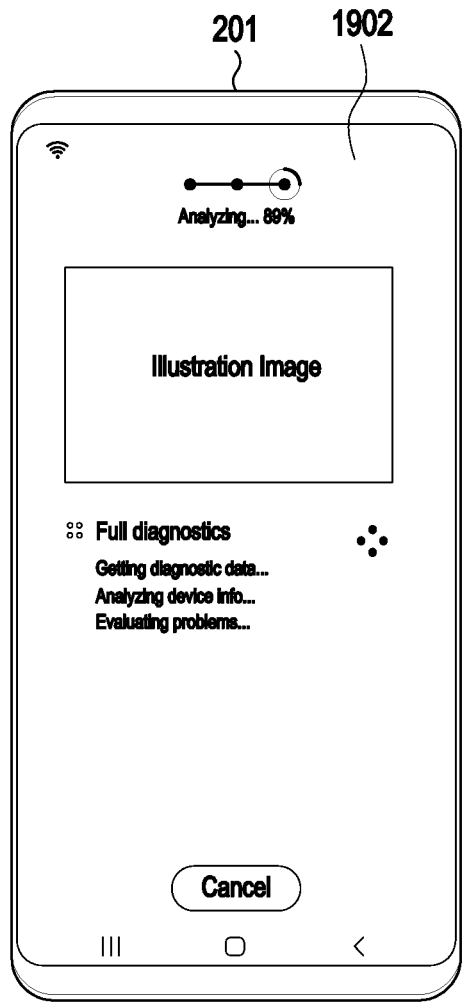
FIGS. 19A and 19B illustrate user interface screens for performing error handling and an error report according to various embodiments of the disclosure.
Figure 19B:
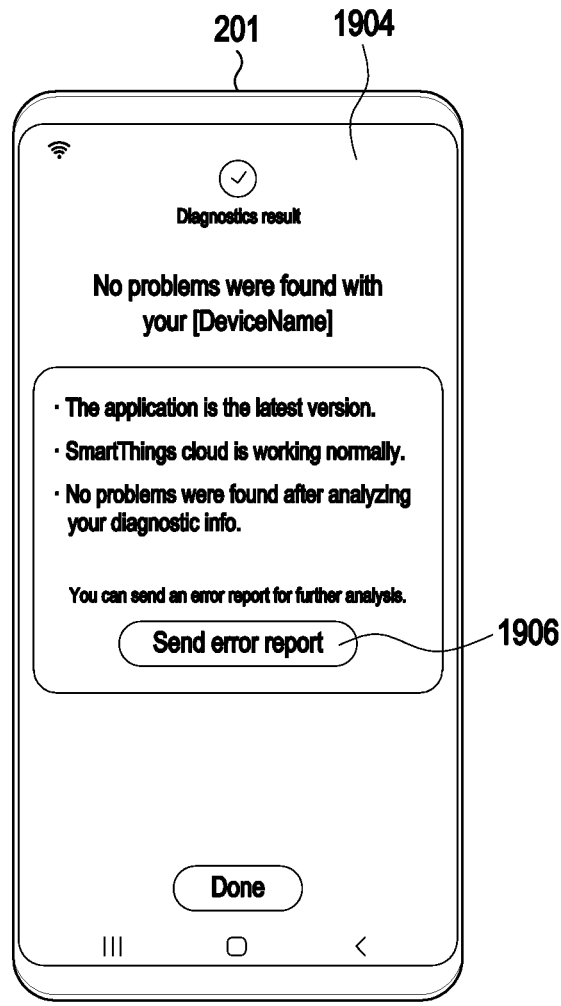

FIGS. 19A and 19B illustrate screens for performing error handling and an error report according to various embodiments of the disclosure.

Referring to FIG. 19A, the electronic device 201 may display a screen 1902 on the display module 260 while analyzing a cause of the offline state on the basis of connection information and device log data received from the controlled device 320. In an embodiment, the screen 1902 may include a phrase indicating diagnostics data collection, device information analysis, and/or error evaluation.

Referring to FIG. 19B, the electronic device 201 may display a screen 1904 including a help guide generated according to the result of analysis of the cause of the offline state of the controlled device 320 on the display module 260. In an embodiment, the screen 1904 may include a phrase indicating the checking result for at least one of a software version of the client application, a cloud state, device information, or a device operation state. In an embodiment, when no error is found, the screen 1904 may not provide a help guide. In an embodiment, when no error is found, the screen 1904 may include an object 1906 (for example, an error report button) for transmitting an error report. In an embodiment, the screen 1904 may be displayed in operation 1302.

Figure 20:
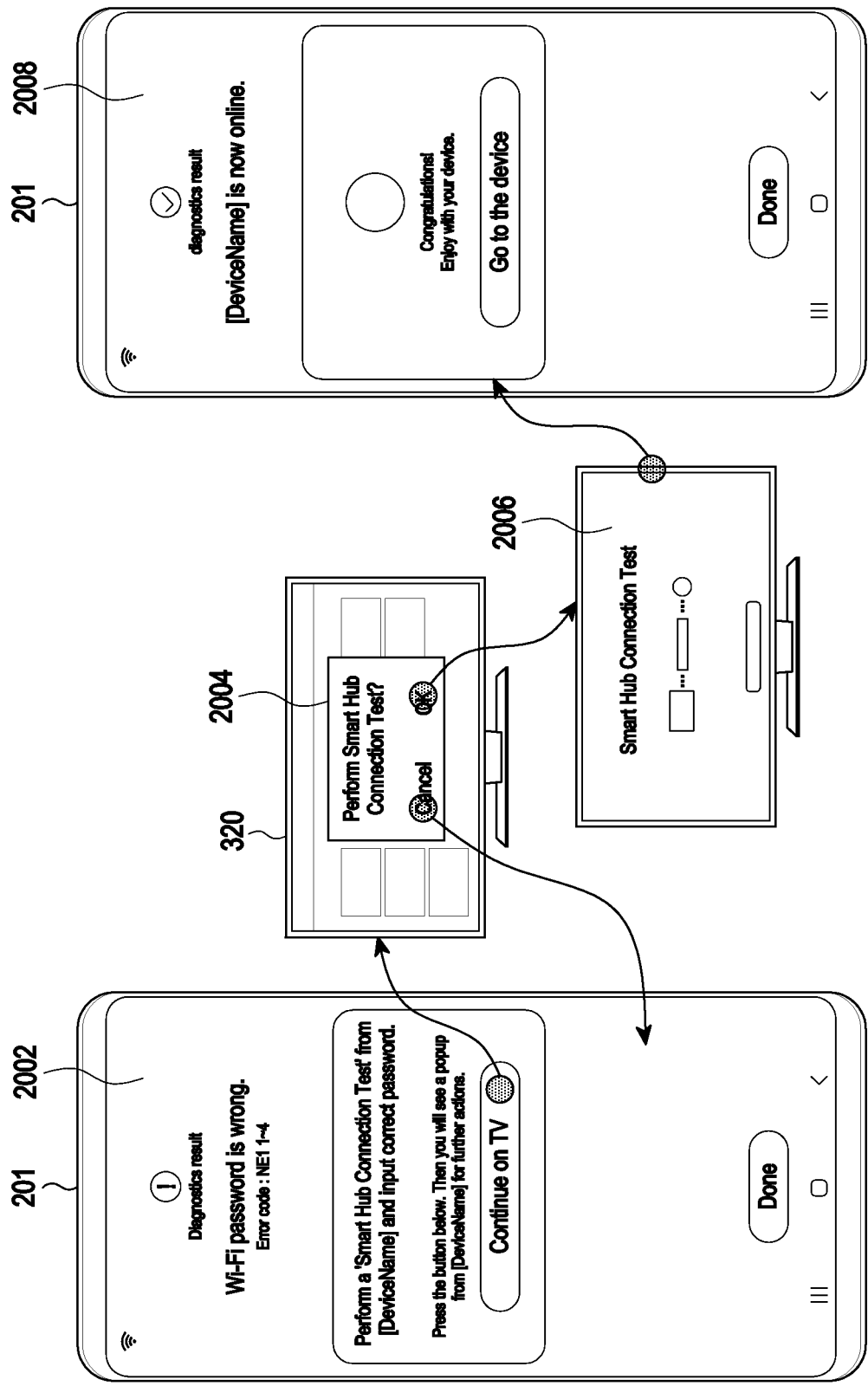
FIG. 20 illustrates user interface screens for performing error handling through a unsecure connection according to an embodiment of the disclosure.

FIG. 20 illustrates screens for performing error handling through a unsecure connection according to an embodiment of the disclosure.

Referring to FIG. 20, the electronic device 201 may display a help guide screen 2002 including a help guide generated according to the result of analysis of the cause of the offline state of the controlled device 320 on the display module 260. In an embodiment, the help guide screen 2002 may include a phrase indicating the cause of the error (for example, "Wi-Fi password is incorrect") and a help guide (for example, "Execute connection test in the device and input the accurate password" and/or "Press the following button to additionally solve the problem in the device"). In an embodiment, the controlled device 320 may be a TV, and the help guide screen 2002 may include a button (for example, "Continue on TV") for identifying to continue error handling in the controlled device 320. In an embodiment, the help guide screen 2002 may be displayed in operation 1302.

In an embodiment, the electronic device 201 may receive a user input through the button and transmit a recovery command indicting the performance of an additional operation of error handling to the controlled device 320 (for example, the TV). The controlled device 320 may display a screen 2004 for the connection test in response to the recovery command. The connection test screen 2004 may include, for example, a button for executing the connection test, and when the button receives a user input, the controlled device 320 may execute hub connection test according to a self function. For example, the controlled device 320 may display a screen 2006 based on the hub connection test. In an embodiment, the controlled device 320 may transmit the result of the hub connection test to the electronic device 201.

In an embodiment, the electronic device 201 may display a result screen 2008 on the display module 260 on the basis of reception of the result of the hub connection test. In an embodiment, the result screen 2008 may include a phrase indicating that the controlled device 320 becomes in an online state. In an embodiment, the result screen 2008 may include an error report button indicating transmission of an error report related to the controlled device 320, and the electronic device 201 may transmit an error report message including the result of error handling of the controlled device 320 to the server 310 in response to reception of a user input on the error report button. In an embodiment, the result screen 2008 may be displayed in operation 1314.

FIG. 21 illustrates screens for performing error handling through a secure connection according to an embodiment of the disclosure.

Referring to FIG. 21, the electronic device 201 may display a help guide screen 2102 including a help guide generated according to the result of analysis of the cause of the offline state of the controlled device 320 on the display module 260. In an embodiment, the help guide screen 2102 may include a guide phrase (for example, "Check whether the router is turned on," "Check the network name of the router," "Make the connection to the 2.4 GHz network when the device supports only the 2.4 GHz Wi-Fi network," "Delete the device and make the connection again if the SSID is changed," "Remove another wireless device interrupting the Wi-Fi connection of the device," "Turn off the router and turn it on again to attempt the connection," or "Update firmware of the router to the latest") according to the result of analysis of the offline state of the controlled device 320 by the electronic device 201 on the basis of the offline error code. In an embodiment, the help guide screen 2102 may include a button 2104 (for example, "Reboot") indicating transmission of a recovery command to the controlled device 320. In response to reception of a user input through the button 2104, the electronic device 201 may transmit the recovery command (for example, a reboot command) to the controlled device 320.

In an embodiment, the electronic device 201 may transmit the recovery command and display the screen 2104 on the display module 260. The screen 2104 may include a phrase indicating that the connection to the device is being attempted. In an embodiment, the screen 2104 may be displayed in at least one of operation 1304, operation 1308, or operation 1310.

In an embodiment, the electronic device 201 may receive a message (for example, the state message of operation 1310) indicating that the controlled device 320 is connected to the server 310 from the server 310 and display a result screen 2106 on the display module 260. The result screen 2106 may include a phrase indicating that the controlled device 320 becomes in the online state. In an embodiment, the result screen 2106 may include an error report button indicating transmission of an error report related to the controlled device 320, and the electronic device 201 may transmit an error report message including the result of error handling of the controlled device 320 to the server 310 in response to reception of a user input on the error report button. In an embodiment, the result screen 2106 may be displayed in operation 1314.

Figure 22:
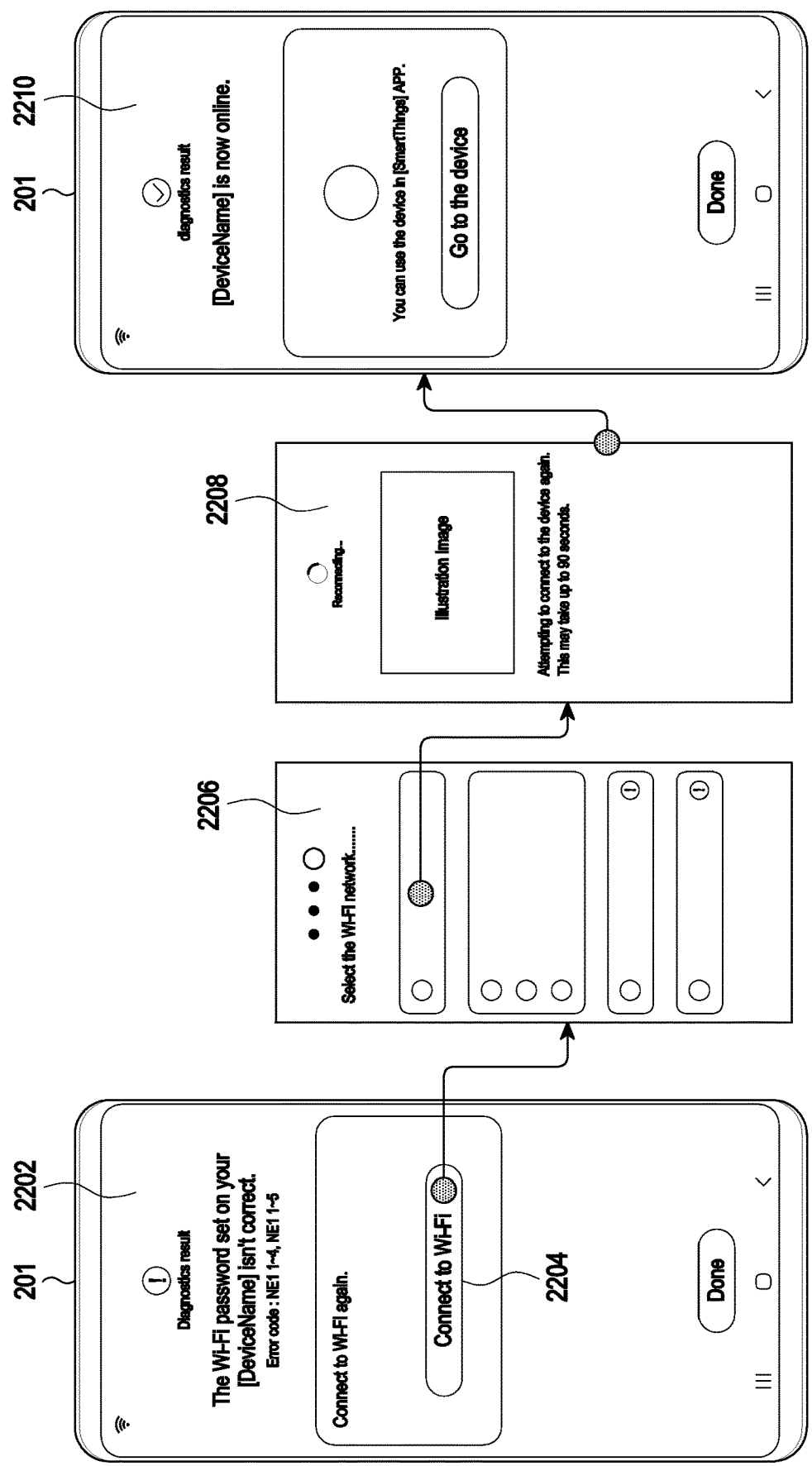
FIG. 22 illustrates user interface screens for guiding network reselection through error handling according to an embodiment of the disclosure.

FIG. 22 illustrates screens guiding network reselection through error handling according to an embodiment of the disclosure.

Referring to FIG. 22, the electronic device 201 may display a help guide screen 2202 including a help guide generated according to the result of analysis of the causes of the offline state of the controlled device 320 on the display module 260. In an embodiment, the help guide screen 2202 may include a button 2204 (for example, "Connect to Wi-Fi") indicating the Wi-Fi reconnection together with a guide phrase (for example, "Wi-Fi password configured in the device is not correct") according to the result of analysis of the offline state of the controlled device 320 by the electronic device 201 on the basis of the offline error code. In response to reception of a user input through the button 2204, the electronic device 201 may make a request for a Wi-Fi scan list to the controlled device 320.

In an embodiment, the electronic device 201 may display a screen 2206 including a Wi-Fi scan list received from the controlled device 320 on the display module 260. In an embodiment, the screen 2206 may include at least one network name (for example, a Wi-Fi AP) to which the controlled device 320 can be connected. When one network is selected in the screen 2206, the electronic device 201 may transmit a recovery command including Wi-Fi information related to the selected network to the controlled device 320 and display a screen 2208 to the display module 260. The screen 2208 may include a phrase indicating that the connection to the device is being attempted. In an embodiment, the screen 2208 may be displayed in at least one of operation 1304, operation 1308, or operation 1310.

In an embodiment, the electronic device 201 may receive a message (for example, the state message of operation 1310) indicating that the controlled device 320 is connected to the server 310 from the server 310 and display a result screen 2210 on the display module 260. The result screen 2210 may include a phrase indicating that the controlled device 320 is in the online state. In an embodiment, the result screen 2210 may include an error report button indicating transmission of an error report related to the controlled device 320, and the electronic device 201 may transmit an error report message including the result of error handling of the controlled device 320 to the server 310 in response to reception of a user input on the error report button. In an embodiment, the result screen 2210 may be displayed in operation 1314.

The electronic device 201 according to an embodiment may include the communication circuit 290 and at least one processor 220 operatively connected to the communication circuit. The at least one processor may be configured to receive device information of the external electronic device 320 from the server 310. The at least one processor may be configured to display a guide screen for guiding a communication connection with the external electronic device, based on the device information. The at least one processor may be configured to establish the communication connection with the external electronic device through the communication circuit, based on a user input on the guide screen. The at least one processor may be configured to receive connection information including an error code related to an offline state of the external electronic device and device log data from the external electronic device through the communication connection. The at least one processor may be configured to transmit a recovery command to the external electronic device through the communication connection, based on the error code and the device log data. The at least one processor may be configured to receive a message indicating that the external electronic device is connected to the server from the server.

In an embodiment, the guide screen may include at least one of a phrase for guiding the communication connection or an object for establishing the communication connection.

In an embodiment, the at least one processor may be configured to display a help guide screen related to the offline state processed based on the error code and transmit the recovery command, based on a user input for the help guide screen.

In an embodiment, the at least one processor may be configured to disconnect the communication connection with the external electronic device, based on reception of the message.

In an embodiment, the at least one processor may be configured to transmit a request message for checking ownership to the external electronic device through the communication connection, receive a response message including a first personal identification number (PIN) from the external electronic device, receive a second PIN from a user, and in case that the first PIN is identical to the second PIN, complete check of the ownership of the external electronic device.

In an embodiment, the at least one processor may be configured to check the ownership of the external electronic device by using credential information acquired during a process of registering the external electronic device in the server. In an embodiment, the at least one processor may be configured to check the ownership of the external electronic device by using credential information received from an owner device of the external electronic device.

In an embodiment, the at least one processor may be configured to identify that information indicating that the external electronic device supports direct connection diagnostics is included in the device information, activate an object executing the direct connection diagnostics within the guide screen, and establish the communication connection, based on reception of the user input through the object executing the direct connection diagnostics.

In an embodiment, the recovery command may include at least one of a reboot command for the external electronic device or Wi-Fi information for Wi-Fi networks to which the external electronic device can be connected.

In an embodiment, the at least one processor may be configured to, in case that the offline error code indicates a network error, make a request for a Wi-Fi scan list including at least one Wi-Fi network to which the external electronic device can be connected to the external electronic device, receive the Wi-Fi scan list from the external electronic device, select a first Wi-Fi network from the Wi-Fi scan list, based on a user input, and transmit the recovery command including Wi-Fi information for the selected first Wi-Fi network to the external electronic device.

In an embodiment, the at least one processor may be configured to transmit an error report message including the error code to the server, based on reception of the message.

A method of operating the electronic device 201 according to an embodiment may include an operation 605 of receiving device information of the external electronic device 320 from the server 310. The method may include an operation 615 of displaying a guide screen for guiding a communication connection with the external electronic device, based on the device information. The method may include an operation 620 of establishing the communication connection with the external electronic device through the communication circuit, based on a user input on the guide screen. The method may include operations 630 and 635 of receiving connection information including an error code related to an offline state of the external electronic device and device log data from the external electronic device through the communication connection. The method may include an operation 640 of transmitting a recovery command to the external electronic device through the communication connection, based on the error code and the device log data. The method may include an operation 640 of receiving a message indicating that the external electronic device is connected to the server from the server.

In an embodiment, the guide screen may include at least one of a phrase for guiding the communication connection or an object for establishing the communication connection.

In an embodiment, the method may further include an operation of displaying a help guide screen related to the offline state processed based on the error code and an operation of transmitting the recovery command, based on a user input for the help guide screen.

In an embodiment, the method may further include an operation of disconnecting the communication connection with the external electronic device, based on reception of the message.

In an embodiment, the method may further include an operation of transmitting a request message for checking ownership to the external electronic device through the communication connection, receiving a response message including a first personal identification number (PIN) from the external electronic device, receiving a second PIN from a user, and in case that the first PIN is identical to the second PIN, completing check of the ownership of the external electronic device.

In an embodiment, the method may further include an operation of checking the ownership of the external electronic device by using credential information acquired during a process of registering the external electronic device in the server. In an embodiment, the method may further include an operation of checking the ownership of the external electronic device by using credential information received from an owner device of the external electronic device.

In an embodiment, the operation of establishing the communication connection may include an operation of identifying that information indicating that the external electronic device supports direct connection diagnostics is included in the device information, an operation of activating an object executing the direct connection diagnostics within the guide screen, and an operation of establishing the communication connection, based on reception of the user input through the object executing the direct connection diagnostics.

In an embodiment, the recovery command may include at least one of a reboot command for the external electronic device or Wi-Fi information for Wi-Fi networks to which the external electronic device can be connected.

In an embodiment, the method may further include an operation of, in case that the error code indicates a network error, making a request for a Wi-Fi scan list including at least one Wi-Fi network to which the external electronic device can be connected to the external electronic device, receiving the Wi-Fi scan list from the external electronic device, an operation of selecting a first Wi-Fi network from the Wi-Fi scan list, based on a user input, and an operation of transmitting the recovery command including Wi-Fi information for the selected first Wi-Fi network to the external electronic device.

In an embodiment, the method may further include an operation of transmitting an error report message including the error code to the server, based on reception of the message.

In an embodiment, the method may further include an operation of determining whether the external electronic device supports direct connection diagnostics (DCD).

In an embodiment, the method may further include, in response to determining that the external electronic device does not support DCD, an operation of executing a basic diagnostics procedure on the external electronic device.

In an embodiment, the basic diagnostics procedure may include checking a client application on the external electronic device, checking a Wi-Fi connection, running basic diagnostics and displaying results.

In an embodiment, the method may further include, in response to determining that the external electronic device supports DCD, an operation of executing a DCD procedure on the external electronic device.

In an embodiment, the DCD procedure may include running basic diagnostics on the external electronic device, directly connecting to the external electronic device, running DCD on the external electronic device, and displaying results.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," coupled ",to", connected with " " or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:
   a communication circuit; and
   at least one processor operatively connected to the communication circuit,
   wherein the at least one processor is configured to:
      receive device information of an external electronic device from a server,
      display a guide screen for guiding a communication connection with the external electronic device, based on the received device information,
      establish the communication connection with the external electronic device through the communication circuit, based on a user input on the guide screen,
      receive connection information comprising an error code related to an offline state of the external electronic device and device log data from the external electronic device through the communication connection,
      transmit a recovery command to the external electronic device through the communication connection, based on the error code and the device log data, and
      receive a message indicating that the external electronic device is connected to the server, from the server.

2. The electronic device of claim 1, wherein the guide screen comprises at least one of a phrase for guiding the communication connection or an object for establishing the communication connection.

3. The electronic device of claim 1, wherein the at least one processor is further configured to:
   display a help guide screen related to the offline state processed based on the error code, and
   transmit the recovery command, based on a user input on the help guide screen.

4. The electronic device of claim 1, wherein the at least one processor is further configured to:
   disconnect the communication connection with the external electronic device, based on reception of the message.

5. The electronic device of claim 1, wherein the at least one processor is further configured to:
   transmit a request message to check ownership of the external electronic device, to the external electronic device through the communication connection,
   receive a response message comprising a first personal identification number (PIN) from the external electronic device,
   receive a second PIN from a user, and
   in case that the first PIN is identical to the second PIN, complete the check of the ownership of the external electronic device.

6. The electronic device of claim 1, wherein the at least one processor is further configured to:
   check ownership of the external electronic device by using credential information acquired during a process of registering the external electronic device in the server, or
   check the ownership of the external electronic device by using credential information received from an owner device of the external electronic device.

7. The electronic device of claim 1, wherein the at least one processor is further configured to:
   identify that information indicating that the external electronic device supports direct connection diagnostics is included in the device information,
   activate an object executing the direct connection diagnostics within the guide screen, and
   establish the communication connection, based on reception of the user input through the object executing the direct connection diagnostics.

8. The electronic device of claim 1, wherein the recovery command comprises at least one of a reboot command for the external electronic device or Wi-Fi information for Wi-Fi networks to which the external electronic device can be connected.

9. The electronic device of claim 1, wherein the at least one processor is further configured to:
   in case that the error code indicates a network error, make a request for a Wi-Fi scan list comprising at least one Wi-Fi network to which the external electronic device can be connected,
   receive the Wi-Fi scan list from the external electronic device,
   select a first Wi-Fi network from the Wi-Fi scan list, based on a user input, and
   transmit the recovery command comprising Wi-Fi information for the selected first Wi-Fi network, to the external electronic device.

10. The electronic device of claim 1, wherein the at least one processor is further configured to:

transmit an error report message comprising the error code to the server, based on reception of the message.

11. A method of operating an electronic device, the method comprising:
receiving device information of an external electronic device from a server;
displaying a guide screen for guiding a communication connection with the external electronic device, based on the device information;
establishing the communication connection with the external electronic device, based on a user input on the guide screen;
receiving connection information comprising an error code related to an offline state of the external electronic device and device log data from the external electronic device through the communication connection;
transmitting a recovery command to the external electronic device through the communication connection, based on the error code and the device log data; and
receiving a message indicating that the external electronic device is connected to the server from the server.

12. The method of claim 11, wherein the guide screen comprises at least one of a phrase for guiding the communication connection or an object for establishing the communication connection.

13. The method of claim 11, further comprising:
displaying a help guide screen related to the offline state processed based on the error code; and
transmitting the recovery command, based on a user input on the help guide screen.

14. The method of claim 11, further comprising disconnecting the communication connection with the external electronic device, based on reception of the message.

15. The method of claim 11, further comprising:
transmitting a request message for checking ownership of the external electronic device to the external electronic device through the communication connection;
receiving a response message comprising a first personal identification number (PIN) from the external electronic device;
receiving a second PIN from a user; and
in case that the first PIN is identical to the second PIN, completing check of the ownership of the external electronic device.

16. The method of claim 11, further comprising:
checking ownership of the external electronic device by using credential information acquired during a process of registering the external electronic device in the server; or
checking the ownership of the external electronic device by using credential information received from an owner device of the external electronic device.

17. The method of claim 11, wherein the establishing of the communication connection comprises:
identifying that information indicating that the external electronic device supports direct connection diagnostics is included in the device information;
activating an object executing the direct connection diagnostics within the guide screen; and
establishing the communication connection, based on reception of the user input through the object executing the direct connection diagnostics.

18. The method of claim 11, wherein the restoration command comprises at least one of a reboot command for the external electronic device or Wi-Fi information for Wi-Fi networks to which the external electronic device can be connected.

19. The method of claim 11, further comprising:
in case that the error code indicates a network error, making a request for a Wi-Fi scan list comprising at least one Wi-Fi network to which the external electronic device can be connected;
receiving the Wi-Fi scan list from the external electronic device;
selecting a first Wi-Fi network from the Wi-Fi scan list, based on a user input; and
transmitting the restoration command comprising Wi-Fi information for the selected first Wi-Fi network to the external electronic device.

20. The method of claim 11, further comprising transmitting an error report message comprising the error code to the server, based on reception of the message.

* * * * *